(12) United States Patent
Mertz et al.

(10) Patent No.: US 11,114,211 B2
(45) Date of Patent: Sep. 7, 2021

(54) HELICAL SCREW ION EXCHANGE AND DESICCATION UNIT FOR NUCLEAR WATER TREATMENT SYSTEMS

(71) Applicant: Veolia Nuclear Solutions, Inc., Westminster, CO (US)

(72) Inventors: Joshua Mertz, Richland, WA (US); Ja-Kael Luey, Richland, WA (US); Wes Bratton, Richland, WA (US); Kenneth Schofield, Holland, MI (US)

(73) Assignee: Veolia Nuclear Solutions, Inc., Westminster, CO (US)

( * ) Notice: Subject to any disclaimer, the term of this patent is extended or adjusted under 35 U.S.C. 154(b) by 14 days.

(21) Appl. No.: 16/555,140

(22) Filed: Aug. 29, 2019

(65) Prior Publication Data
US 2019/0385756 A1     Dec. 19, 2019

Related U.S. Application Data

(63) Continuation of application No. 15/136,600, filed on Apr. 22, 2016, now Pat. No. 10,438,711.

(60) Provisional application No. 62/152,521, filed on Apr. 24, 2015.

(51) Int. Cl.
| | |
|---|---|
| *G21F 9/12* | (2006.01) |
| *B01J 47/10* | (2017.01) |
| *B01J 45/00* | (2006.01) |
| *B01D 15/36* | (2006.01) |
| *B01D 15/20* | (2006.01) |
| *B01J 47/016* | (2017.01) |

(52) U.S. Cl.
CPC ............ *G21F 9/12* (2013.01); *B01D 15/20* (2013.01); *B01D 15/361* (2013.01); *B01J 45/00* (2013.01); *B01J 47/016* (2017.01); *B01J 47/10* (2013.01)

(58) Field of Classification Search
CPC .. G21F 9/12; B01J 45/00; B01J 47/016; B01J 47/10; B01D 15/20; B01D 15/361
See application file for complete search history.

(56) References Cited

U.S. PATENT DOCUMENTS

| | | | |
|---|---|---|---|
| 4,008,171 A | 2/1977 | Tiepel et al. | |
| 4,500,430 A | 2/1985 | Dasgupta | |
| 5,089,123 A * | 2/1992 | DeVoe | B01D 15/02 210/189 |
| 5,678,237 A | 10/1997 | Powell et al. | |
| 5,947,887 A | 9/1999 | White et al. | |

(Continued)

FOREIGN PATENT DOCUMENTS

| | | | |
|---|---|---|---|
| RU | 2228794 C1 | 5/2004 | |
| WO | WO-9209672 A1 * | 6/1992 | ......... B01D 11/0276 |

OTHER PUBLICATIONS

English-language machine translation of RU 2228794 C1.
Schwabe Williamson & Wyatt, PC Listing of Related Cases; 2 pages; dated Apr. 22, 2016.

*Primary Examiner* — James C Goloboy
(74) *Attorney, Agent, or Firm* — Holland & Hart LLP

(57) ABSTRACT

Disclosed herein are systems, methods, processes, and apparatuses for treating radioactive waste, through systems designed to bind and dry radioactive media. In some of its various embodiments, the system includes at least one helical screw designed to receive and mix liquid wastes with ion exchange media, as well as convey the resulting slurry through one or more of a binding, dewatering, and drying/off-gassing region.

16 Claims, 21 Drawing Sheets

(56) References Cited

U.S. PATENT DOCUMENTS

| | | |
|---|---|---|
| 6,283,908 B1 | 9/2001 | Powell et al. |
| 6,558,308 B2 | 5/2003 | Powell et al. |
| 6,941,878 B2 | 9/2005 | Powell et al. |
| 7,211,038 B2 | 5/2007 | Thompson et al. |
| 7,429,239 B2 | 9/2008 | Thompson et al. |
| 7,651,618 B2 | 1/2010 | Ohashi et al. |
| 2006/0157416 A1* | 7/2006 | Seidel ............ B01J 39/17 210/688 |
| 2010/0184151 A1 | 7/2010 | Tolan et al. |
| 2014/0356270 A1 | 12/2014 | Shmayda et al. |
| 2015/0368136 A1 | 12/2015 | Raymont et al. |

* cited by examiner

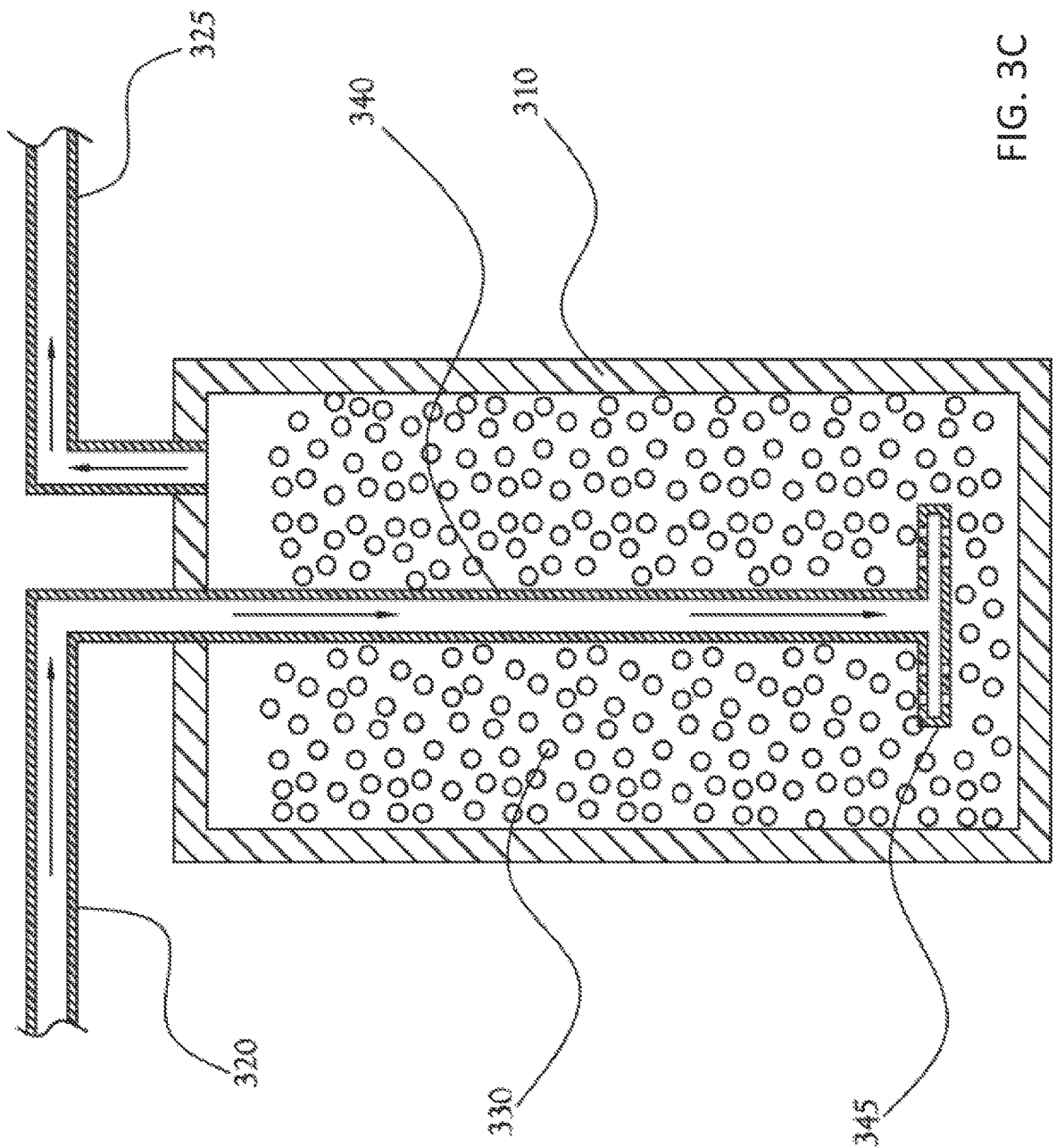

HELICAL SCREW ION EXCHANGE AND DESICCATION UNIT FOR NUCLEAR WATER TREATMENT SYSTEMS

COPYRIGHT NOTICE

Contained herein is material that is subject to copyright protection. The copyright owner has no objection to the facsimile reproduction by anyone of the patent document or the patent disclosure, as it appears in the United States Patent and Trademark Office patent file or records, but otherwise reserves all rights to the copyright whatsoever. The following notice applies to the software, screenshots, and data as described below and in the drawings hereto and All Rights Reserved.

CROSS-REFERENCE TO RELATED APPLICATIONS

This application is a continuation of U.S. application Ser. No. 15/136,600, filed Apr. 22, 2016, which in turn claims the benefit of U.S. Provisional Application No. 62/152,521, filed Apr. 24, 2015.

TECHNICAL FIELD

This disclosure relates generally to methods and apparatus for nuclear waste water remediation.

BACKGROUND

The ability to isolate and manage specific radioactive ions is necessary for clean, safe, and secure radioactive waste management, which in turn is essential for the safe and cost-effective use of nuclear power.

The concentration of particular radioactive isotopes in waste materials generally determines the waste classification of the waste material (for example, Class A, Class B, Class C, and Greater than Class C). The waste classification of waste material in turn delineates the storage and disposal requirements for that waste material. As a rule, waste material that receives a higher classification, such as Class B or Class C, faces stricter storage and disposal requirements, is more costly to manage, and can be legally stored in fewer locations. Therefore, it is desirable to limit the volume and amount of waste material that receives a higher classification by separating or removing from that waste material those specific radioactive isotopes that drive waste classification. In this regard, particularly desirable are systems, methods, and processes for the separation of Cs-137, Sr-90, Ni-63, Tc-99, Am-241, Co-58, Co-60, and several isotopes of Uranium. It would also be advantageous for the ion-separation technology to facilitate long-term storage or disposal as, for example, through vitrification.

With a worldwide need for abundant and inexpensive energy production, nuclear generated power is increasing exponentially along with world population growth. The first commercial nuclear power stations started operation in June 1954. Since then, nuclear power generation has increased such that there are over 430 commercial nuclear power reactors operable in 31 countries, with over 370,000 MWe of total capacity. As of 2014, there are 70 more reactors under construction. Increased nuclear power production requires an increase in nuclear waste remediation.

With the present state of the art, nuclear waste typically exists as either in-service contaminated water used in fuel pool storage or loaded onto ion specific media (ISM) contained within a nuclear vessel and then stored within the vessel until further processing or final stabilization is conducted. In preparation for effective loading onto ion specific media, it may be beneficial to preprocess the waste. This preprocessing may include multiple stages of filtering to remove insoluble impurities, decantation to remove oils or greases, flocculants to remove colloids and other suspended particles, precipitants to remove particular undesirable chemical species, reverse osmosis (RO) units to concentrate the radionuclides, and acids or bases for pH control. Preprocessing is especially important when nuclear waste is the result of an accident, any type of spill, or decommissioning operations.

Containerization of nuclear waste has multiple liabilities. First, since nuclear waste can have a large volume and mass relative to its radioactivity, it requires a large space and is therefore expensive to store. Second, since it is usually stored at a site other than where it was produced, there is the danger inherent in transportation accidents. Third, there is the danger of leakage once it is stored. Storage of radioactive liquids is not considered a viable long term solution. The volume reduction offered by ion exchange processes requires pretreatment of the nuclear waste before the radionuclides from the nuclear waste can be loaded onto ion exchange media, then dewatering the media, reducing the volume of the waste resulting in a secondary, more highly radioactive media to process. Because the processing of the radioactive media is typically done at a later date and at another site this radioactive media is stored and then transported before its final processing and eventual disposition. The transportation and storage of radioactive media creates is expensive and creates contamination risks.

So as to reduce the complexity and length of the Detailed Specification, Applicant(s) herein expressly incorporate(s) by reference all of the following materials identified in each numbered paragraph below. The incorporated materials are not necessarily "prior art" and Applicant(s) expressly reserve(s) the right to swear behind any of the incorporated materials.

Advanced Tritium System and Advanced Permeation System for Separation of Tritium from Radioactive Wastes and Reactor Water in Light Water Systems, Ser. No. 62/239,660 filed Oct. 9, 2015, which is herein incorporated by reference in its entirety.

GeoMelt Electrode Seal, Ser. No. 62/272,604 filed Dec. 29, 2015, which is herein incorporated by reference in its entirety.

Mobile Processing System for Hazardous and Radioactive Isotope Removal, Ser. No. 14/748,535 filed Jun. 24, 2015, with a priority date of Jun. 24, 2014, which is herein incorporated by reference in its entirety.

Ion Specific Media Removal from Vessel for Vitrification, Ser. No. 15/012,101 filed Feb. 1, 2016, with a priority date of Feb. 1, 2015, which is herein incorporated by reference in its entirety.

Balanced Closed Loop Continuous Extraction Process for Hydrogen Isotopes, Ser. No. 14/294,033, filed Jun. 2, 2014, with a priority date of May 31, 2013, which is herein incorporated by reference in its entirety.

Methods for Melting of Materials to be Treated, U.S. Pat. No. 7,211,038 filed Mar. 25, 2001, with a priority date of Sep. 25, 2001, which is herein incorporated by reference in its entirety.

Methods for Melting of Materials to be Treated, U.S. Pat. No. 7,429,239 filed Apr. 27, 2007, with a priority date of Sep. 25, 2001, which is herein incorporated by reference in its entirety.

In-Situ Vitrification of Waste Materials, U.S. Pat. No. 5,678,237 filed Jun. 24, 1996, with a priority date of Jun. 24, 1996, which is herein incorporated by reference in its entirety.

Vitrification of Waste with Continuous Filling and Sequential Melting, U.S. Pat. No. 6,283,908 filed May 4, 2000, with a priority date of May 4, 2000, which is herein incorporated by reference in its entirety.

AVS Melting Process, U.S. Pat. No. 6,558,308 filed Apr. 25, 2002, with a priority date of May 7, 2001, which is herein incorporated by reference in its entirety.

Advanced Vitrification System 2, U.S. Pat. No. 6,941,878 filed Sep. 26, 2003, with a priority date of Sep. 27, 2002, which is herein incorporated by reference in its entirety.

Applicant(s) believe(s) that the material incorporated above is "non-essential" in accordance with 37 CFR 1.57, because it is referred to for purposes of indicating the background or illustrating the state of the art. However, if the Examiner believes that any of the above-incorporated material constitutes "essential material" within the meaning of 37 CFR 1.57(c)(1)-(3), applicant(s) will amend the specification to expressly recite the essential material that is incorporated by reference as allowed by the applicable rules.

Aspects and applications presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112, 6. Thus, the use of the words "function," "means" or "step" in the Detailed Description or Description of the Drawings or claims is not intended to somehow indicate a desire to invoke the special provisions of 35 U.S.C. § 112, 6, to define the systems, methods, processes, and/or apparatuses disclosed herein. To the contrary, if the provisions of 35 U.S.C. § 112, 6 are sought to be invoked to define the embodiments, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ", if the claims also recite any structure, material or acts in support of that means or step, or that perform the recited function, then it is the clear intention of the inventors not to invoke the provisions of 35 U.S.C. § 112, 6. Moreover, even if the provisions of 35 U.S.C. § 112, 6 are invoked to define the claimed embodiments, it is intended that the embodiments not be limited only to the specific structure, material or acts that are described in the preferred embodiments, but in addition, include any and all structures, materials or acts that perform the claimed function as described in alternative embodiments or forms, or that are well known present or later-developed, equivalent structures, material or acts for performing the claimed function.

BRIEF DESCRIPTION OF THE DRAWINGS

A more complete understanding of the systems, methods, processes, and/or apparatuses disclosed herein may be derived by referring to the detailed description when considered in connection with the following illustrative figures. In the figures, like-reference numbers refer to like-elements or acts throughout the figures. The presently preferred embodiments are illustrated in the accompanying drawings, in which:

FIG. 3C is a section view of the embodiment shown in FIGS. 3A and 3B.

Figure 1:
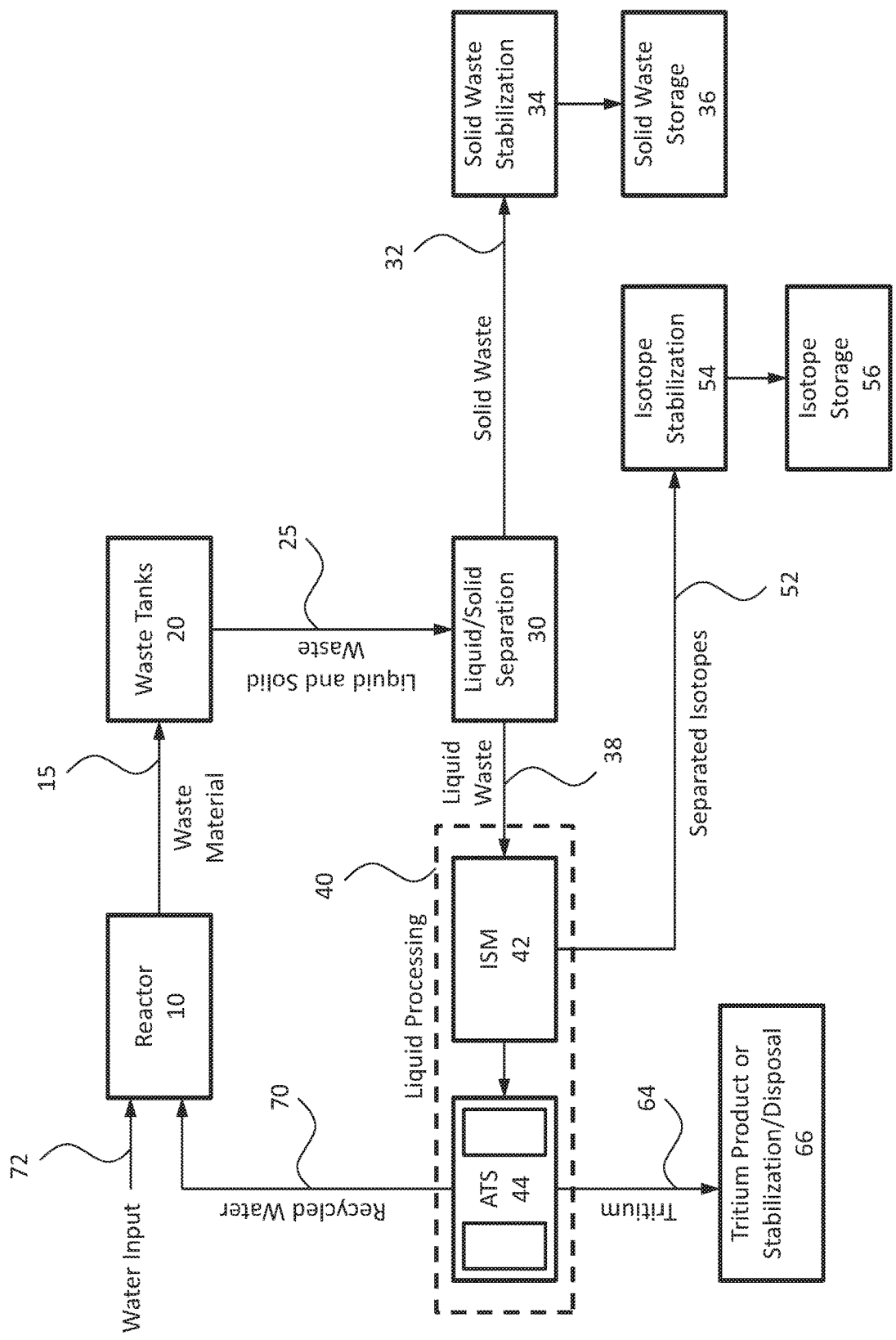
FIG. 1 is a block diagram illustrating one example of a system for processing radioactive waste materials that includes an ISM-based system for separating specific radioactive ions from liquid radioactive waste material.

Elements and acts in the figures are illustrated for simplicity and have not necessarily been rendered according to any particular sequence or embodiment.

DETAILED DESCRIPTION

In the following description, and for the purposes of explanation, numerous specific details, process durations, and/or specific formula values are set forth in order to provide a thorough understanding of the various aspects of exemplary embodiments. It will be understood, however, by those skilled in the relevant arts, that the apparatus, systems, and methods herein may be practiced without these specific details, process durations, and/or specific formula values. It is to be understood that other embodiments may be utilized and structural and functional changes may be made without departing from the scope of the apparatus, systems, and methods herein. In other instances, known structures and devices are shown or discussed more generally in order to avoid obscuring the exemplary embodiments. In many cases, a description of the operation is sufficient to enable one to implement the various forms, particularly when the operation is to be implemented in software. It should be noted that there are many different and alternative configurations, devices, and technologies to which the disclosed embodiments may be applied. The full scope of the embodiments is not limited to the examples that are described below.

In the following examples of the illustrated embodiments, references are made to the accompanying drawings which form a part hereof, and in which is shown by way of illustration various embodiments in which the systems, methods, processes, and/or apparatuses disclosed herein may be practiced. It is to be understood that other embodiments may be utilized and structural and functional changes may be made without departing from the scope.

Disclosed herein are systems and methods for nuclear waste remediation, particularly for the removal of radionuclides from nuclear waste using a single portable process, a helical screw ion exchange (HSIX) unit, which combines one or more of mixing, binding, and drying ion exchange media for final long-term storage or vitrification. The portable HSIX unit may be fully scalable, able to accommodate massive-scope industrial nuclear waste cleanup projects worldwide, contaminant adjustable, work with any ion-specific media (ISM), and controllable to maximize ion exchange time and conditions in preparing the final stabilized waste form. Combining processing steps into a single unit increases efficiency, reduces time, and produces an improved final product.

The helical screw ion exchange (HSIX) unit takes contaminated nuclear waste water and processes it utilizing ion exchange media (also referred to as ion-specific media (ISM)) for extracting radionuclides from nuclear waste in a continuous or batch fashion and then further moving the mixture into a kiln type operation that heats and dries the mixture to create a stabilized material that is then easier to store and/or directly prepare for final processing using compaction and/or vitrification or other thermal or grouting processes. The heating and drying of the mixture is a controlled process that ensures that the captured radionuclides remain on the media and only the excess liquids and volatile organic materials are removed. All volatiles are captured in at least one off-gas unit to ensure there is no release of radionuclides to the environment. The process system is portable, designed for ease of transfer from one site to another with flexibility for operating in different modes of filtration and ion removal.

The portability of the process system has multiple advantages over fixed installations including:

- Avoids off-site transportation of waste minimizing both cost and risk.
- Ability to be assembled and tested in a factory with samples of waste to ensure that it functions properly before being transported to the site.
- Easily upgraded, either in part or in entirety, as more advanced techniques become available.
- Ability to deal with non-routine problematic wastes, which may require unique combinations of decontamination techniques.
- Ability to be immediately deployed to accident situations.
- Ability to be temporarily deployed such as in decommissioning situations where building new permanent facilities are to be avoided.

Ion-specific media (ISM) is used to selectively remove specific radionuclides that determine waste classification. One aim of the present invention is to direct the isotopes that drive waste-classification, especially Cs-137, Sr-90, Ni-63, Tc-99, Am-241, Co-58, Co-60, and several isotopes of Uranium, into very small packages for on-site storage, enhancing the volume of lower-classification waste for disposal off-site.

In some embodiments, the ISM is based on or contains Herschelite (Chabazite), a porous mineral substance with a combined external and internal surface area of approximately 500 square meters per gram. Other embodiments use glass-based microspheres with average diameters on the order of 10 to 100 microns, combined external and internal surface areas of 100 to 200 square meters per gram, and total porosity of approximately 35% to 40%. Additional embodiments use ISM based on or containing inorganic ion transfer media. Following is a partial list of inorganic ion transfer media that may be used as the ion-specific media (ISM):

1. Cesium Specific Media (CSM), to include modified Herschelite: a modified mineral in both fine and granular format with high specificity and capacity for cesium (Cs) and strontium (Sr). Modified Titanate (Ti): an amorphous titanosilicate based granular or powdered media for cesium removal. Potassium Cobalt Hexacyanoferrate (KCCF) impregnated glass microspheres (GMS): Exceptional specificity and capacity for Cs.

2. Strontium Specific Media (SSM), to include Hydroxy Apatite (HA) modified glass microspheres (GMS): High specificity and capacity for $^{90}$Sr and the actinides (e.g., Am and Pu). Modified Herschelite: See modified mineral above. Modified Titanate: see modified Ti above.

3. Transition Metal Specific media, for example Nickel ($^{63}$Ni), Cobalt ($^{58/60}$Co) and Iron ($^{55}$Fe), comprising HA modified glass microspheres and/or modified titanosilicates as described above.

4. Technetium ($^{99}$Tc) specific media, to include Iron (Fe) impregnated glass microspheres (GMS); Surfactant modified Hydroxy Apatite; Surfactant modified Herschelite. Surfactant modified Titanate; Surfactant modified Bentonite; and zero-valent iron impregnated Herschelite and HA 5. Iodine ($^{129}$I), Antimony ($^{125}$Sb), Selenium (Se), Arsenic (As), and Bismuth (Bi) specific media, to include Iron (Fe) impregnated glass microspheres (GMS): High specificity for this series of ions. Surfactant Modified Herschelite and HA GMS. Silver impregnated zeolite (AGZ). Silver impregnated Herschelite (AGH).

6. Other proprietary compositions.

These porous or highly porous media separate and retain specific radionuclides from non-radiological and/or hazardous liquid waste streams. The radioactive ions, when they come into contact with the media particles or constituents, are retained on the reactive surface areas of the ISM or within the interstitial spaces of the porous structures. In general, each type of ISM used in the present invention is selected to separate a specific ion or a specific family or group of ions. In many embodiments, the media are embedded, impregnated, or coated with a specific compound to enhance the capture of the specific radionuclides that the media is designed to separate.

FIG. 1 illustrates an example embodiment of a larger system within which an advanced tritium system (ATS) 44 for tritium separation is a component. As shown in the illustration, radioactive waste material 15 from a nuclear reactor 10 is conveyed first to waste tanks 20, where the waste material is kept submerged in water; as a result of storing radioactive waste, the water itself comes to contain a concentration of radioactive isotopes. The waste material, which at this stage includes both liquid and solid wastes 25, is conveyed from the waste tanks 20 to a liquid/solid separation system 30 where liquid wastes 38 (including the water from the waste tanks 20) are separated from the solid wastes. From the liquid/solid separation system 30, the solid wastes 32 proceed to stabilization 34 and storage 36. It is possible that, in some instances, not all of the moisture or liquid mixed with the solid wastes 32 will be separated from the solid wastes 32 by the liquid/solid separation system 30, in which case the stabilization and storage of those wastes will proceed differently.

From the liquid/solid separation system 30, liquid wastes 38 that are substantially free of solid waste material proceed to a liquid processing system 40. In some embodiments, such as the one illustrated in FIG. 1, the liquid processing system 40 comprises an ion-specific-media (ISM) based system 42 for the separation of specific ions and an ATS 44 for the separation or removal of tritium from the liquid wastes 38. Separated ions 52 removed by the ISM from the liquid wastes 38 are stabilized 54 and moved to storage 56 or other disposition (with the final disposition or storage conditions often dependent upon the specific ions involved). Tritium 64 removed from the liquid wastes proceeds to its own disposition 66. The liquid 70 (mostly water), now substantially free of specified radioactive isotopes and tritium, usually is recycled into the reactor 10, where it is combined with other water 72 fed into the reactor 10. In some embodiments, liquid emerging from the liquid processing system 40 proceeds, not to the reactor 10 to be recycled, but to storage for low-classification waste.

In many embodiments of the present invention, the ISM-based separation 42 of specific radioactive isotopes from liquid wastes includes running liquid wastes through a modified ion exchange column (hereinafter an "ISM column"), wherein the liquid is passed through a column of ISM and the ISM attract and retain specific radioactive ions within the liquid; the radioactive ions then remain with the ISM in the column while the liquid exits the column.

A number of ISM materials can be used. Many of the media used for ISM-based separation include porous glass or porous glass-based materials. Many of the media used for ISM-based separation include some form of Herschelite or one or more Herschelite derivatives. Many of the media used for ISM-based separation include some mineral material or mineral-based material. The nature of the ISM used in the column generally is dependent upon the ion to be removed. For example, in some embodiments, media for the separation of cesium (i.e., cesium-specific media) include modified Herschelite ($(Na,Ca,K)AlSi_2O_6 \cdot 3H_2O$).

In some embodiments, cesium-specific media include Herschelite modified with (e.g., mixed with, coated with, or impregnated with) potassium cobalt hexacyanoferrate ("KCCF"). In some embodiments, media for the separation of strontium ions (i.e., strontium-specific media) include glass-based microspheres modified to hydroxyapatite ("HA microspheres"). In some embodiments, media for the separation of technetium ions (i.e., technetium-specific media) include Herschelite modified with cetyltrimethylammonium ("CTMA"). In some embodiments, technetium-specific media include a surfactant-modified zeolite (SMZ), such as a zeolite in which some of the surface cations of the zeolite are replaced by a high-molecular-weight surfactant such as CTMA. In some embodiments, technetium-specific media include a zero-valent iron impregnated Herschelite or HA microspheres. In some embodiments, media for the separation of nickel ions (i.e., nickel-specific media) include Herschelite or HA microspheres. In some embodiments, media for the separation of cobalt ions (i.e., cobalt-specific media) include Herschelite or HA microspheres. In some embodiments, media for the separation of lead ions (i.e., lead-specific media) include Herschelite or HA microspheres. In some embodiments, media for the separation of iodine ions (i.e., iodine-specific media) include Herschelite impregnated with silver.

In some embodiments, media for the separation of arsenic ions (i.e., arsenic-specific media) include Herschelite impregnated with iron. In some embodiments, media for the separation of selenium ions (i.e., selenium-specific media) include HA microspheres modified with CTMA or Herschelite impregnated with iron. In some embodiments, media for the separation of antimony ions (i.e., antimony-specific media) include HA microspheres modified with CTMA or Herschelite impregnated with iron. In some embodiments, media for the separation of americium ions (i.e., americium-specific media) include HA microspheres. Other ISM for the separation of ions from liquid wastes include media for the separation of nickel, cobalt, lead, iron, antimony, iodide, selenium, americium, mercury, fluoride, plutonium, and uranium. ISM may include media for targeting isotopes and/or ions, including, but not limited to, Ni-63, Co-58, Co-60, Fe-55, Sb-125, I-129, Se-79, Am-241, and Pu-239. Other media used in some embodiments may include a modified form of hydroxyapatite in which other cations substitute for at least some of the calcium ions, the other cations often being ions such as strontium, tin, or silver. Other media used in some embodiments may include SMZ in which the zeolite has been modified with one or more anionic or cationic surfactants. Other media used in some embodiments may include glass-based microspheres impregnated with iron or silver. Other media used in some embodiments may include silver-impregnated zeolites. Other media used in some embodiments may include silver-modified zirconium oxide, silver-modified manganese oxide, and iron-modified aluminum silicate. In general, a number of media, including Herschelite, silver-impregnated Herschelite, iron-impregnated Herschelite, Herschelite modified with KCCF, Herschelite modified with CTMA, HA microspheres, HA microspheres modified with CTMA, and HA microspheres modified with KCCF, are used to separate one or more specific radioactive ions from liquid wastes. The media given here are examples and do not constitute an exhaustive list of materials used in ISM-based ion-separation systems and processes. Some columns include a combination of two or more media.

Figure 2A:
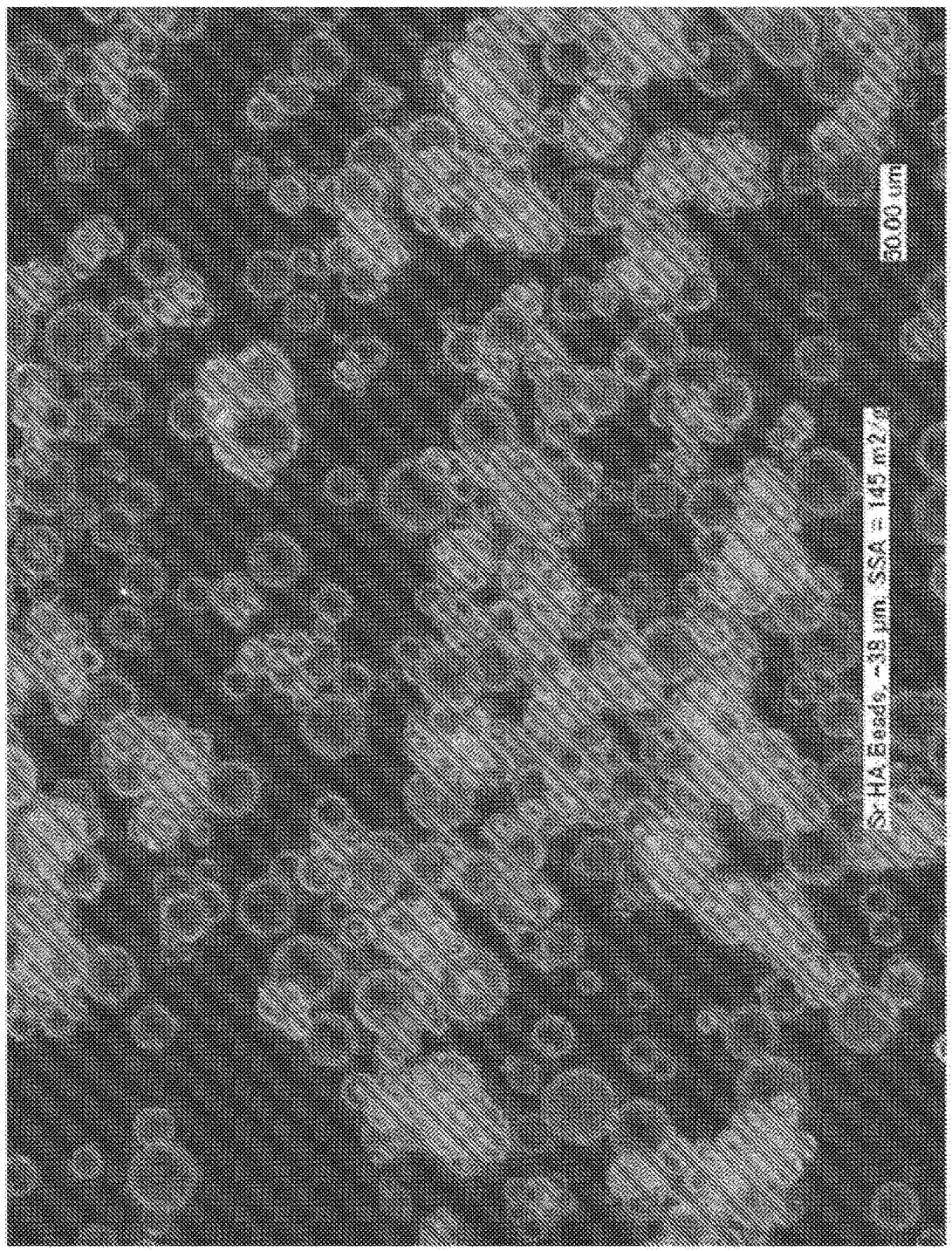
FIG. 2A is a photograph of an electron microscope image of glass-based microspheres for use in an ISM-based system for separating specific radioactive ions from liquid radioactive waste material.
Figure 2B:
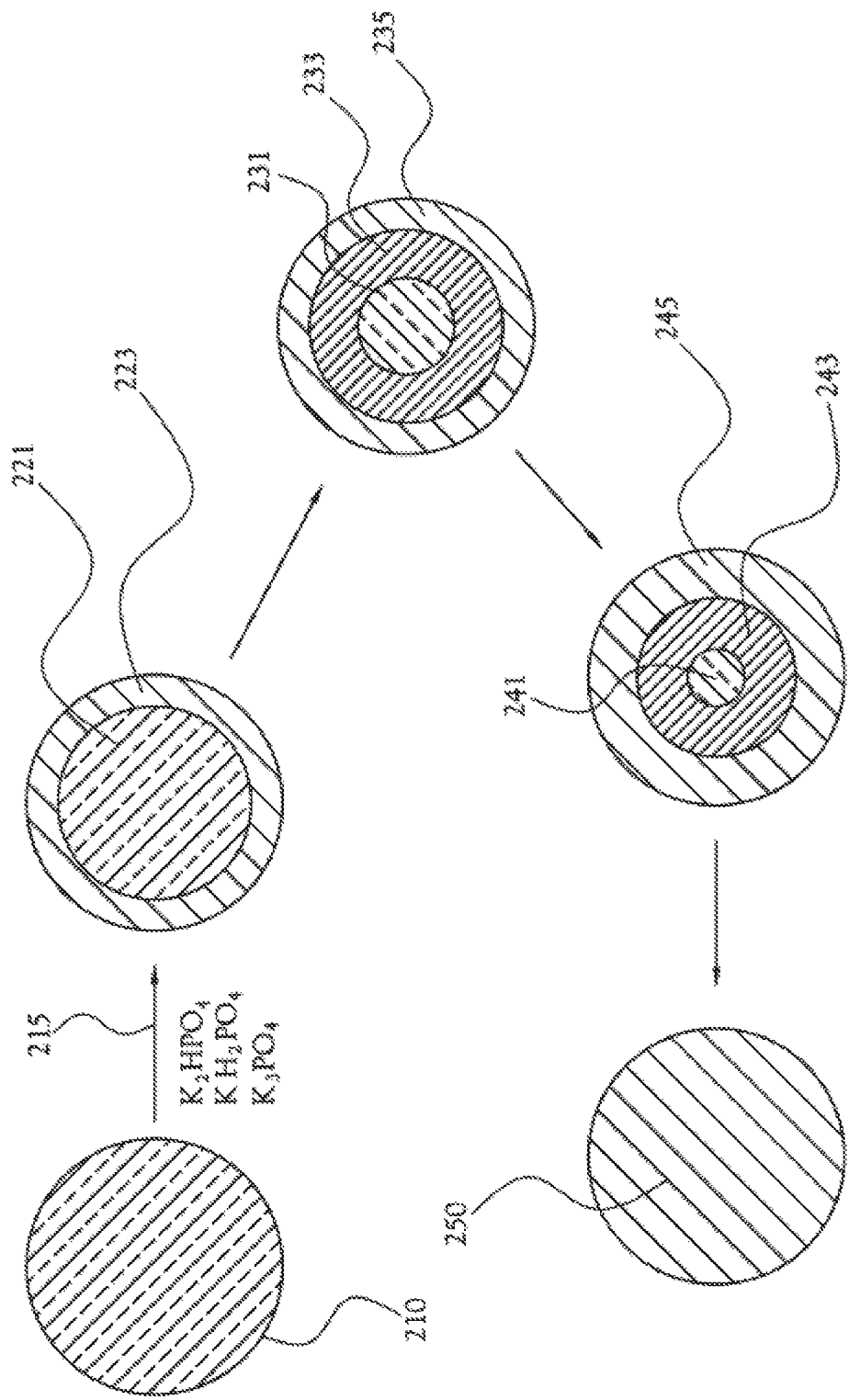
FIG. 2B is a diagram illustrating an embodiment of a process for forming glass-based microspheres from Hydroxy Apatite (HA), which are then used or modified for use in an ISM-based system for separating specific radioactive ions from liquid radioactive waste material.
Figure 2C:
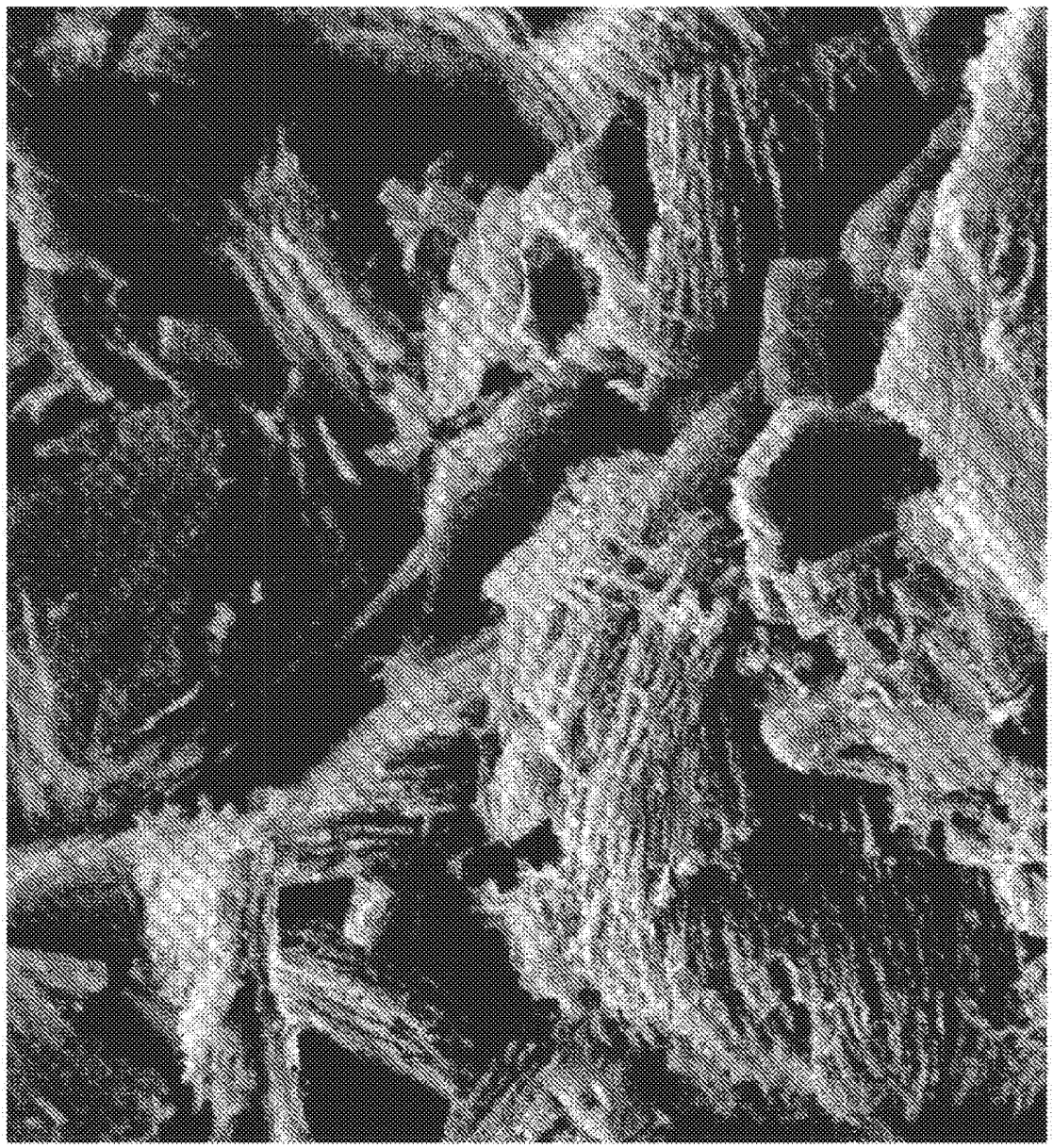
FIG. 2C is a photograph of an electron microscope image of a Herschelite material for use in an ISM-based system for separating specific radioactive ions from liquid radioactive waste material, the image showing the Herschelite with approximately 1050 times magnification.

In some embodiments, the ISM column comprises ISM in the form of porous microspheres, especially glass-based microspheres. FIG. 2A is a photograph of an electron microscope image of HA-modified glass-based microspheres used, for example, for separating strontium. FIG. 2B illustrates one process through which one type of porous glass-based microsphere is prepared from HA. Some embodiments of the process begin with glass beads 210 fabricated from a mixture comprising sodium, calcium, and boron. The glass beads 210 are mixed 215 with a potassium phosphate solution (or similar phosphate solution) with basic pH; in many embodiments, the solution also includes potassium hydroxide or another hydroxide source. As sodium, calcium, and boron ions are released from the glass, beginning at the surface of the glass beads 210, phosphate and hydroxide ions react with calcium that remains on the beads to form a layer of amorphous calcium phosphate 223 surrounding the unreacted glass core 221 of the bead. As phosphate and hydroxide ions continue to act on the glass core 221, and the unreacted core shrinks 231 and the layer of amorphous calcium phosphate 233 grows. At the same time, the amorphous calcium phosphate furthest from the site of reaction on the glass core, in conjunction with hydroxide ions drawn from the solution, begins to stabilize into a hydroxyapatite (HA) layer 235. The HA layer continues to grow 245 as the glass core continues to shrink 241 and react to form amorphous calcium phosphate 243. The end result of this process is a porous microsphere 250 substantially composed of HA. In many embodiments of the present invention, the ISM column comprises a Herschelite or modified Herschelite material. FIG. 2C is a photograph of an electron microscope image of a Herschelite material.

Figures 3A, 3B:
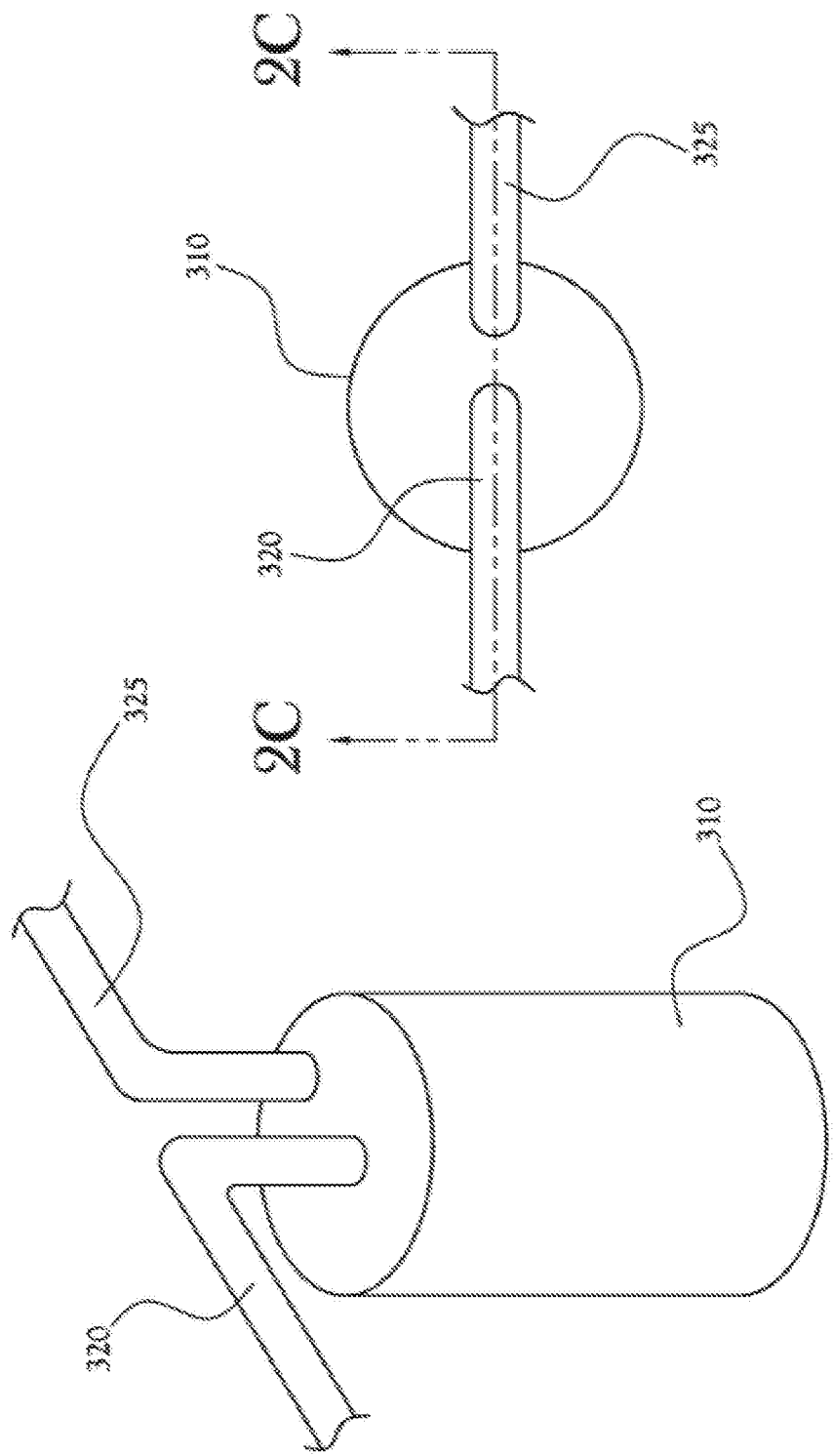
FIG. 3A is a perspective view of one embodiment of an ISM-column.
FIG. 3B is a top-down view of the embodiment shown in FIG. 3A, showing the line along which is taken the section view shown in FIG. 3C.

FIGS. 3A, 3B, and 3C illustrate one embodiment of an ISM column. FIG. 3A presents a perspective view of the column container 310 (in the illustrated embodiment, a cylinder, although other shapes are possible), which is connected to an inlet line 320 and an outlet line 325. FIG. 3B presents a top-down view of the ISM column, showing the line along which the section view shown in FIG. 3C is taken. As shown in the section view in FIG. 3C, the column tube is largely filled with bead-form ISM 330; in many embodiments, the ISM 330 comprise glass-based microspheres or similar materials, as described above. A dip tube 340 extends from the top of the column container 310 into the interior of the column, nearly to the bottom of the column container 310. A distribution ring 345 is connected to the lower end of the dip tube 340. When liquid waste material containing radioactive ions enters the column though the inlet line 320 (travelling in the direction indicated by the arrows in FIG. 3C), the liquid travels down the dip tube 340 and into the distribution ring 345. The distribution ring 345 disperses liquid throughout the width of the column, and the liquid enters the space filled with ISM 330. As liquid is pumped or otherwise forced though the inlet line 320 and dip tube 340 into the column, liquid is forced to rise through the ISM space, passing by and through the porous ISM 330. As the liquid passes near and through the ISM 330, the media attract and retain specific radioactive ions carried by the liquid, separating those radionuclides from the liquid. The liquid, having been forced through the ISM 330, exits the column through the outlet line 325 at the top of the column container 310.

As liquid continues to pass through the ISM 330 within the column, the ISM 330 continues to separate and retain radioactive ions. Eventually, as separated radioactive ions come to fill almost all of the available retention sites on the media, the ISM 330 ceases to effectively filter or separate radioactive ions from additional incoming liquid waste material. At this point, the addition of liquid waste material to the column ceases, and the ISM 330, now carrying separated radioactive ions, undergo additional processing preparatory to final storage or disposition. In some embodiments, the ISM beads with separated radioactive ions are removed from the column container 310 and conveyed to a storage container for later processing. In some embodiments, the ISM beads 330 with separated radioactive ions are removed from the column container 310 and conveyed to a crucible or melter for vitrification. In some embodiments, the ISM 330 with separated radioactive ions remain in the column container 310, and the vitrification of the ISM 330 with separated radioactive ions takes place within the column container 310.

In an embodiment, a helical screw ion exchange (HSIX) unit is used as an exchange column leveraging and manipulating certain operational conditions within the HSIX unit to increase the exchange of ions. Conditions such as temperature, concentrations, flow rates, etc. may affect the binary reaction. All exchange reactions may occur in a forward and reverse direction, depending on an equilibrium constant and reaction quotient. With respect now to equations 2 through 4, below, and underlying the general discussion of the binary exchange reaction, a number of concepts are described including a discussion of the equilibrium constant K and the reaction quotient Q and their relationships to one another.

The equilibrium constant, K, of a chemical reaction is the value of the reaction quotient, Q, when the reaction has reached equilibrium. At any given temperature, the equilibrium constant, K, has a value which is independent of the initial and actual concentrations of the reactant and product species. A given set of initial concentrations, K can be used to determine the composition of a system at equilibrium.

The second property is the reaction quotient, Q. The reaction quotient, Q, measures the relative amounts of products and reactants present during a reaction at a particular point in time. The reaction quotient, Q, aids in figuring out which direction a reaction is likely to proceed, given the concentrations of the reactants and the products. The Q value can be compared to the equilibrium constant, K, to determine the direction of the reaction that is taking place.

One difference between K and Q is that K describes a reaction that is at equilibrium, whereas Q describes a reaction that is not at equilibrium. To determine Q, the concentrations of the reactants and products are determined. The reaction quotient is defined mathematically and similarly to the Equilibrium constant for the binary exchange reaction, where the ratio of reactants to products are written as:

$$\text{Reactants} \leftrightarrow \text{Products} \tag{1}$$

The reversibility of ion-exchange reactions affects the behavior of ion-exchange systems. Typical ion-exchange reactions can be written as follows:

$$A^+ + B^+Res^- \leftrightarrow B^+ + A^+Res^- \tag{2}$$

$$bA^{+a} + aB^{+B} \leftrightarrow bA^{+a} + aB^{+b} \tag{3}$$

Where Res⁻ stands for an ion fixed in either organic resin, inorganic media or other type of exchanger and $A^+$ and $B^+$ are univalent cations (monopositive ions) while $C^{2+}$ (below) is a divalent cation.

As is generally true of reversible reactions, equations can be written describing the relative concentrations (amount of material per unit volume) of the various species in equilibrium—that is, when the rate of the forward reaction is equaled by that of the reverse reaction. For the ion-exchange processes indicated above, the following equations demonstrate the relations of the materials present under the conditions of equilibrium. Expressed in terms of the Equilibrium Constant K; where K is the dimensionless ratio of the sum of the products over the sum of the reactants:

$$K_0 = \frac{[Product_1][Product_2]}{[Reactant_1][Reactant_2]} \tag{4}$$

$$K_1 = \frac{[B^+][A^+Res^-]}{[A^+][B^+Res^-]} \text{ monopositive} \tag{5}$$

A second case is a divalent:

$$C^2 + 2B^+Res^- \leftrightarrow 2B^+ + C^+(Res^-)_2 \tag{6}$$

$$K_2 = \frac{[2B^+][C^{2+}(Res^-)_2]}{[C^{2+}][2B^+Res^-]} \text{Divalent} \tag{7}$$

If $K_0=10$ at equilibrium and the sum of the products is 10, then the sum of the reactants will be 1 or 10/1.

At an initial startup at $K_0=10$, if products are not yet formed, the sum of the products will be 0, and the reaction quotient Q will be 0/1 or 0. Zero is less than 10, so the reaction will favor the formation of products. If however, the sum of the products is greater than 10, say 20, when the sum of the reactants is 1, the reaction will be 20/1 or 20 which is greater than 10 and reactants will be favored and the reaction operates in reverse.

Figure 4:
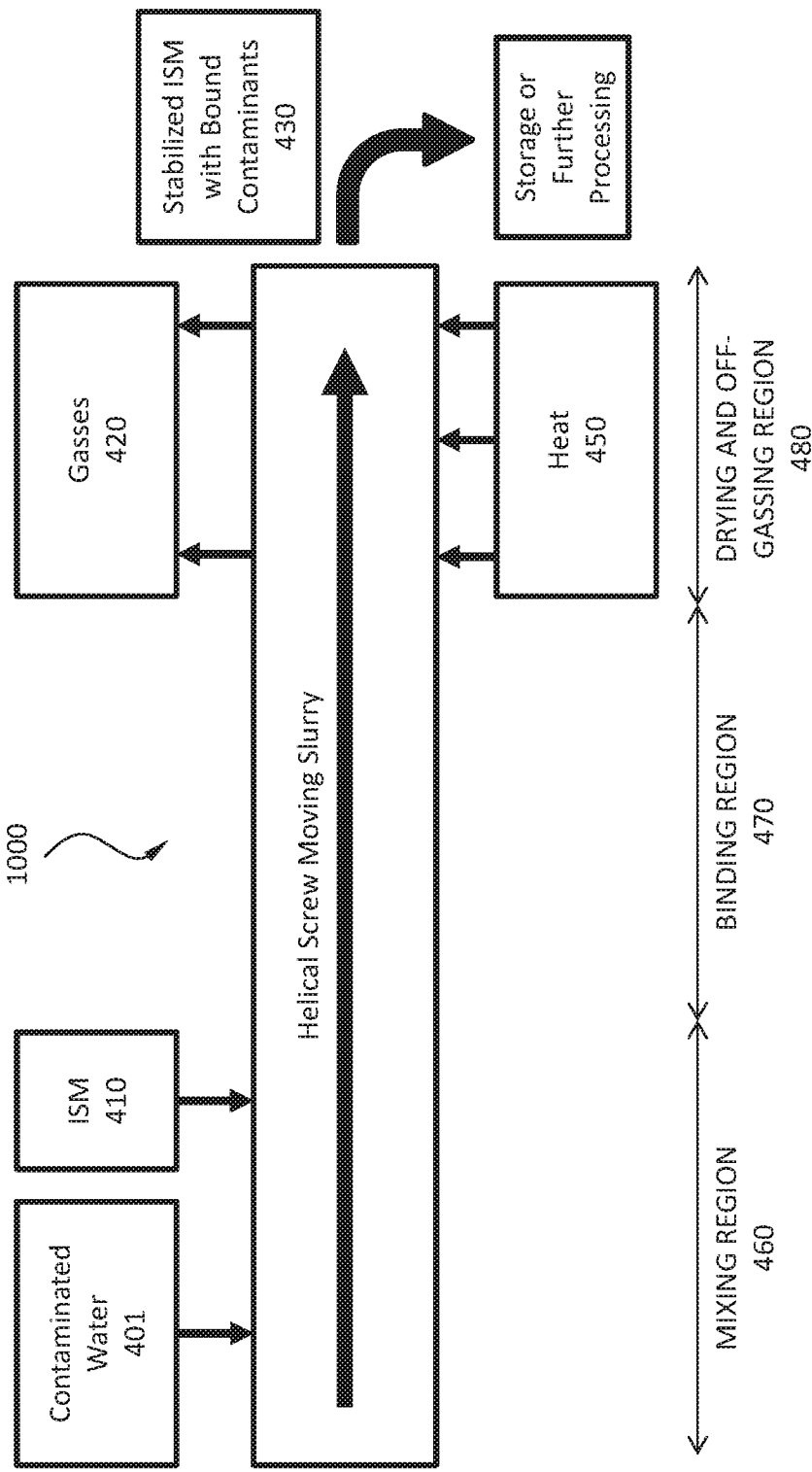
FIG. 4 is a representation of a horizontal parallel flow helical screw ion exchange (HSIX) unit.

FIG. 4 is a block diagram representing a horizontal parallel flow helical screw ion exchange (HSIX) unit 1000. The HSIX unit 1000 may be implemented in place of, or in addition to, ISM module 42 (FIG. 1). The process system is portable, scalable, and designed for ease of transfer from one site to another with flexibility for operating in different modes of filtration and ion removal. The HSIX unit 1000 includes a housing with a helical screw that transports waste water 401 and ISM 410 through the steps of mixing 460, binding 470, and drying and off-gassing 480. Some embodiments may further comprise a dewatering region.

In some embodiments HSIX unit housing is cylindrical. In some embodiments the HSIX unit housing is a U-shaped with a flat top surface. In some embodiments the HSIX unit housing may comprise one or more sections of transparent material such that activity occurring inside the HSIX unit may be observed during operation.

The term "waste water" refers to any liquid nuclear waste including, but not limited to, coolant from nuclear reactors, contaminated liquids from spills and accidents, contaminated liquids from waste storage areas, pre-processed liquids that fail to meet release standards, and liquids used to rinse dry waste from containers, filters, or ISM modules. "Waste water", as used herein, may further refer to dry nuclear wastes that have been mixed with water or other liquids to facilitate ion transfer using the HSIX unit 1000.

The diameter, pitch, length, and ribbon width of screw determine a nominal system capacity. Types, pitches, and shaft diameters of screw may vary throughout the HSIX unit 1000. Rotational speed, screw inclination, rate of media feed, and rate of contaminated water 401 feed by screw may all be adjusted during operation depending on the input materials and the desired products. Some embodiments may comprise multiple screws which may increase system capacity. A second end of HSIX system 1000 may be controlled to discharge a fully loaded media slurry (that is, unable to bind any further contaminating ions).

In some embodiments, the length of the HSIX unit 1000 may be reduced by performing one or more stages of pre-processing. For instance, the contaminated water 401 may be passed through one or more filters and or ISM vessels prior to entering the HSIX unit 1000. In some embodiments, one or more of the regions or processes of the HSIX unit 1000 described herein may be standalone.

The horizontal parallel flow HSIX process is described further in the steps below:

Step 1: Introduction of Waste Water to be Treated.

Waste water 401 is introduced at the first end of the HSIX unit 1000. Prior to entry into the HSIX unit 1000 the waste water 401 may be subject to preconditioning. Preconditioning may comprise one or more of: filtering wherein filtering may comprise passing the contaminated waste water 401 through one or more filters of similar or decreasing porosity to remove particulates; decantation to remove oils; addition of flocculants and precipitants followed again by filters to remove colloids and precipitants; passing through a reverse osmosis (RO) unit to concentrate the radionuclide concentrations; and addition of acids or bases to adjust pH for optimal ion exchange.

One embodiment, described in further detail in co-pending application Mobile Processing System for Hazardous and Radioactive Isotope Removal, Ser. No. 14/748,535 filed Jun. 24, 2015, which is herein incorporated by reference in its entirety, includes the preconditioning steps of: adding and blending absorbents with the contaminated waste water 401 and filtering the contaminated waste water 401 through one or more filters to remove the absorbent solids and other particulates. In this embodiment, the ISM skid could be replaced, or used in conjunction with, the HSIX unit 1000.

Step 2: Introduction of ISM—Mixing

Figure 5A:
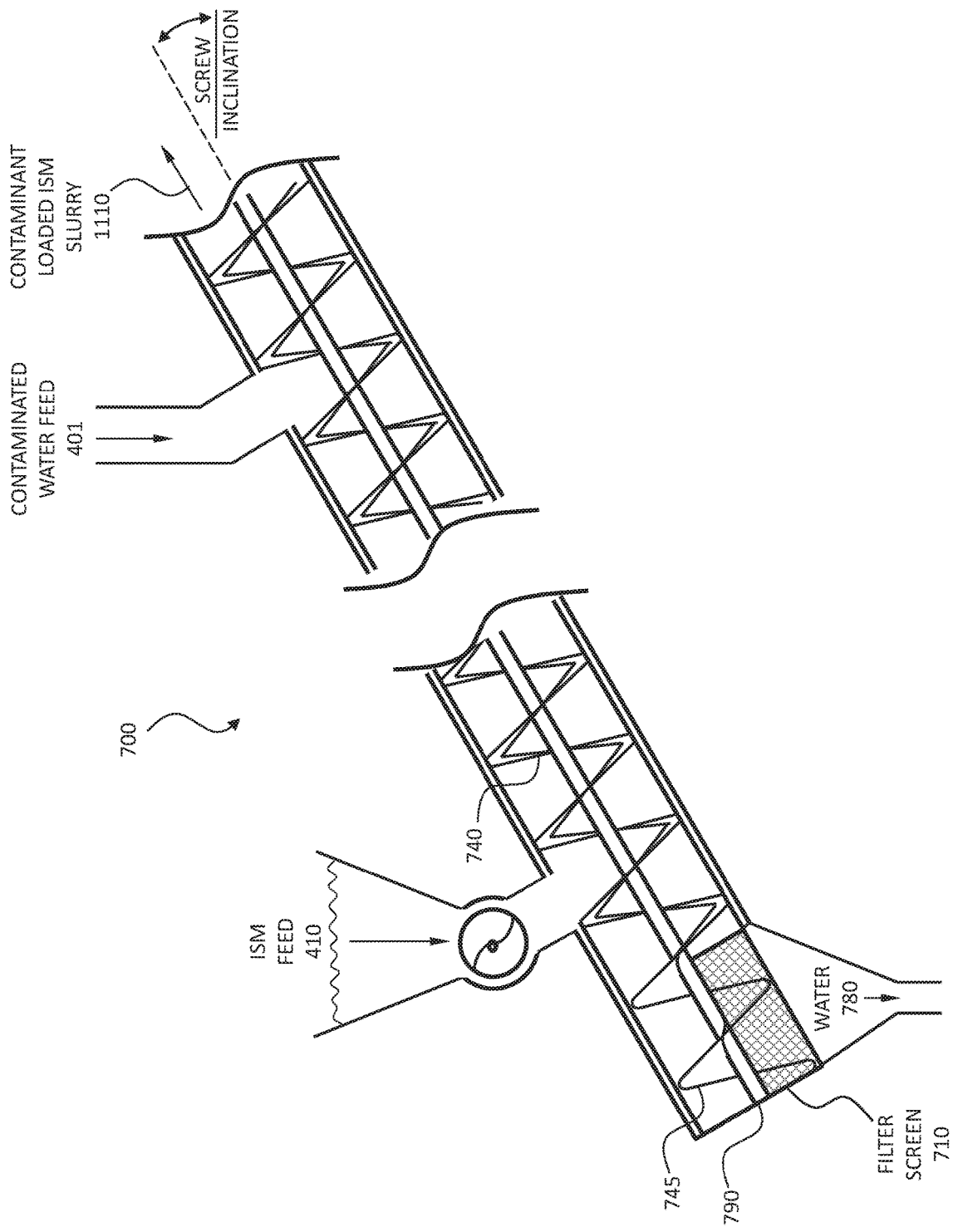
FIG. 5A depicts inclined counter flow mixing region of an HSIX unit.
Figure 5B:
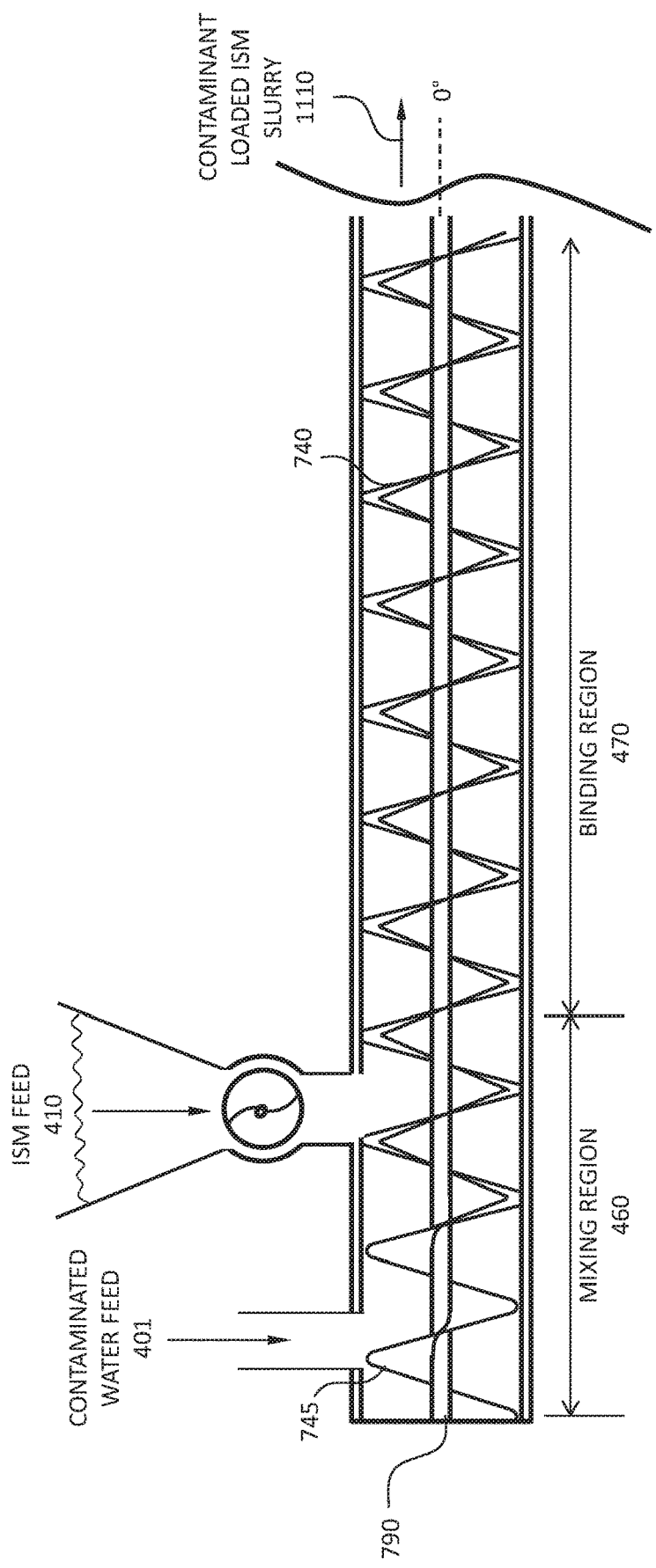
FIG. 5B depicts horizontal parallel flow mixing and binding regions of an HSIX unit.

Ion specific media (ISM) 410 is introduced to the HSIX unit 1000 in the mixing region 460 near the first end at the beginning of the ribbon flight screw (as depicted in FIG. 5B). The ISM 410 is used for extracting the radionuclides from the waste water 401. The ISM 410 used is dependent on the particular waste stream. It may also be pretreated before entering the waste stream and creating the slurry in the mixing region 460 of the HSIX unit 1000. ISM pretreatment may comprise one or more of chemical and mechanical processes to adjust the ISM 410 to a specific pH and/or a specific temperature.

Step 3: Binding

As the ISM/waste water slurry moves along the HSIX unit 1000 the contaminants in the waste water 401 bind to the ISM 410 in the binding region 470. The speed and pitch of the helical screw may be adjustable to accommodate a wide range of binding time requirements. The temperature may also be controlled for optimal binding conditions. Additionally, the incline angle of one or more regions may be adjusted; however, incline affects the configuration of the mixing and binding regions as shown and described in more detail in FIG. 5A.

Step 4: Drying and Off-Gassing

Further, the HSIX unit 1000 moves the media into a kiln type operation in the drying and off-gassing region 480 that heats and dries the media to create a stabilized ISM with bound contaminants 430 which is then easier to store. Further desiccation may be provided through the use of vacuum, air-drying, or other drying methods. Aerosols, particulates, and gasses 420 released during heating 450 may be captured by an off-gas system to ensure there is no release of radionuclides to the environment. The captured Aerosols, particulates, and gasses 420 may be stored for later or remote processing or they may be processed on-site. In some embodiments the Aerosols, particulates, and gasses 420 may be processed on-site using a mobile off-gas processing system such as is described in co-pending application Ion Specific Media Removal from Vessel for Vitrification, Ser. No. 15/012,101 filed Feb. 1, 2016, with a priority date of Feb. 1, 2015, which is herein incorporated by reference in its entirety.

The stabilized ISM with bound contaminants 430 may either proceed directly to storage or may be processed prior to storage. Final processing may comprise one or more of compaction, vitrification, or other thermal or grouting processes. The heating and drying of the ion exchange media is a controlled process that ensures that the captured radionuclides remain on the media and only the excess water and organic materials are removed. In some embodiments, the slurry is mechanically dewatered prior to the drying and off-gassing region 480. Mechanical dewatering systems and methods are further depicted and described in FIGS. 6A through 6D.

FIG. 5A depicts an inclined counter flow mixing region 700 of an HSIX unit 1000. The use of a ribbon screw 740 provides a mixing action as a portion of the rising slurry falls back down the incline over the ribbon flight 740 at each pitch, and the occasional support members from the central shaft 790 to the ribbon 740 cut through the slurry acting as mixing paddles. For an inclined counter flow mixing region 700 of HSIX unit 1000, the ISM feed 410 occurs near the first end of and the contaminated water feed 401 occurs near the second end. At the second end of the inclined counter flow mixing region 700 the ISM 410 has fully bonded with the contaminants in the water 401 forming a contaminant loaded ISM slurry 1110. The length between the ISM feed 410 and the contaminated water feed 401 is dependent on a number of system variables including the contaminant(s) to be removed, concentration of contaminants, type of ISM, incline angle, system temperature, time required to fully bind the ISM 410 to the contaminants in the water feed 401, preprocessing steps (if any), and other related factors. In some embodiments, one or more of the processes may be positioned at different angles relative to each other depending on process requirements such as flow rates, chemical reaction times, material density, and system footprint.

In some embodiments, such as that depicted in FIG. 5A, the first end of the inclined mixing and binding region 700 of HSIX unit 1000 may be extended to accommodate a small number of solid helical flights 745 and the bottom portion of the HSIX unit 1000 housing may be replaced by a filter screen 710, sized according to the media dimension, to prevent ISM from discharging with the water 780. In some embodiments, one or more sensors may be implemented at the first end of the HSIX unit 1000 to monitor the water 780 for relevant characteristics such as purity and flow rate. Sensors may comprise flow rate sensors to monitor for changes in system efficiency caused by clogged filters or the like. The discharged water 780 may proceed to a holding or discharge tank in some embodiments.

For embodiments of the inclined counter flow mixing region 700 of HSIX unit 1000, the system may be controlled to discharge water 780 at the first end that meets release requirements. Thus, a large fraction of water 780 which may be safely reused or disposed of is removed from the system prior to the step of drying the contaminant laden ISM, thereby minimizing system energy requirements. In some embodiments, the water 780 will be sampled prior to release. Water 780 that does not meet release requirements may be rerouted through the process either back to the contaminated water feed 401 or an earlier preprocessing step. Alternatively, water 780, not meeting release requirements may be decontaminated using a separate process. An advantage of the inclined counter flow mixing region 700 is that it aids in dewatering the ISM slurry.

FIG. 5B depicts horizontal parallel flow mixing 460 and binding regions 470 of an HSIX unit 1000. The parallel flow mixing 460 and binding regions 470 of an HSIX unit 1000 comprise a central shaft 790, a ribbon screw 740, contaminated water feed 401, ISM feed 410, and in some embodiments a solid flight screw 745. In some embodiments two or more different screw flight types may be included at one or more different pitches including variable pitch. The contaminated water feed 401 enters at the first end. The ISM feed 410 follows the contaminated water feed 401. At the second end of the horizontal parallel flow mixing 460 and binding region 470 the ISM 410 has fully bonded with the contaminants in the water 401 forming a contaminant loaded ISM slurry 1110. The length between the two feed points 401 and 410, as well as the overall length of the mixing region 460 is dependent on a number of system variables including type and concentration of contaminant(s) in the water, ISM type, time to bind, system temperature, preprocessing steps (if any), and other related factors.

FIGS. 6A through 6D depict two types of mechanical dewatering regions. Mechanical dewatering using a helical screw may be performed by an increasing shaft diameter with a constant pitch solid flight screw (depicted in FIGS. 6A and 6B) or with a constant shaft diameter and a solid flight screw of decreasing pitch from inlet to outlet (depicted in FIGS. 6C and 6D). In the mechanical dewater regions of FIGS. 6A-6D, water 1140 may be passed through a filter screen 1160 and re-routed to the contaminated water feed 401 to be fed through an HSIX unit 1000 continuously. In some embodiments, the water 1140 may be sampled prior to exiting the dewatering region. If the water is deemed to fall within release standards it may be rerouted for storage or reuse or released to the environment.

Figures 6A, 6B:
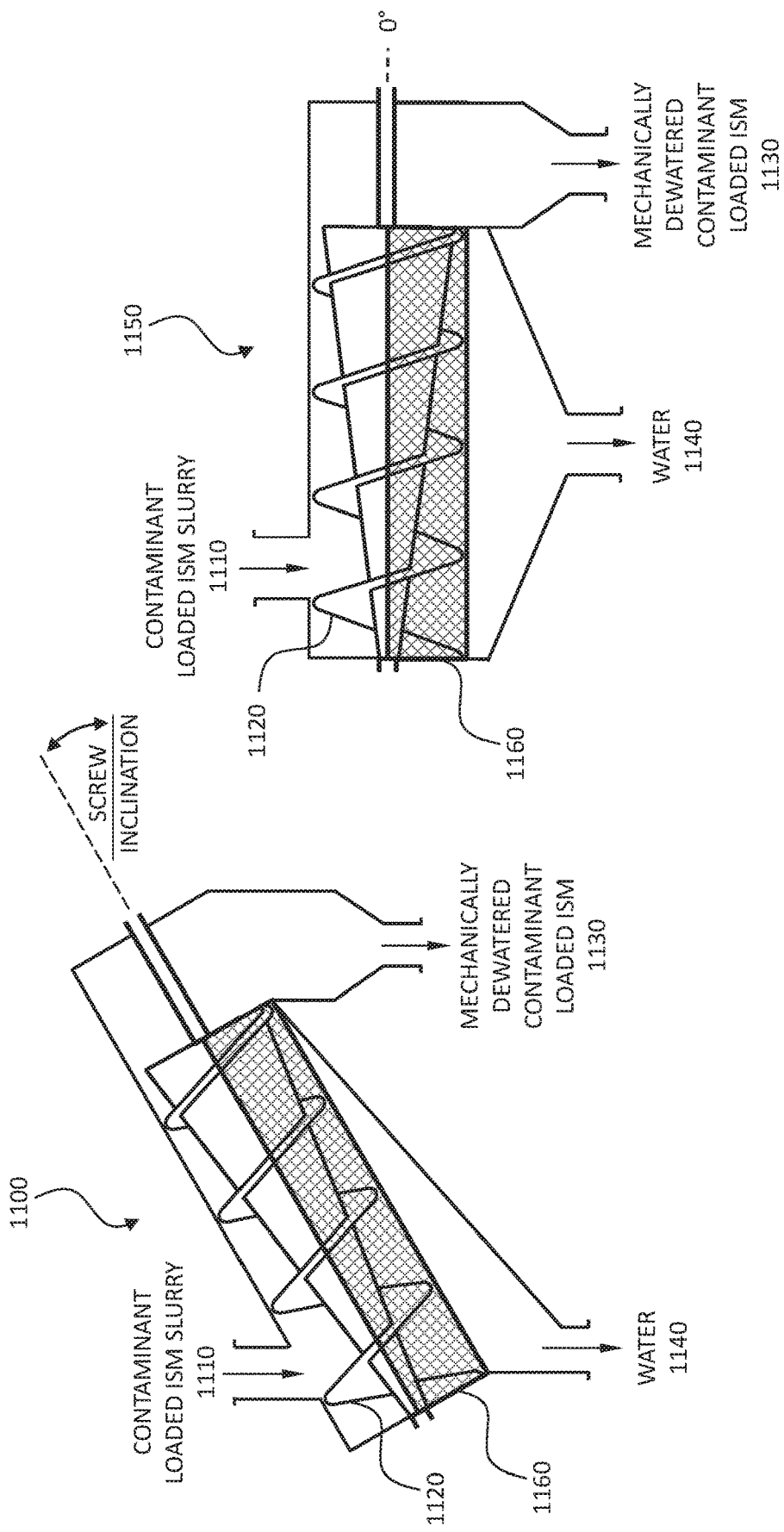
FIG. 6A depicts an inclined tapered shaft mechanical dewatering region.
FIG. 6B depicts a horizontal tapered shaft mechanical dewatering region.
Figures 6C, 6D:
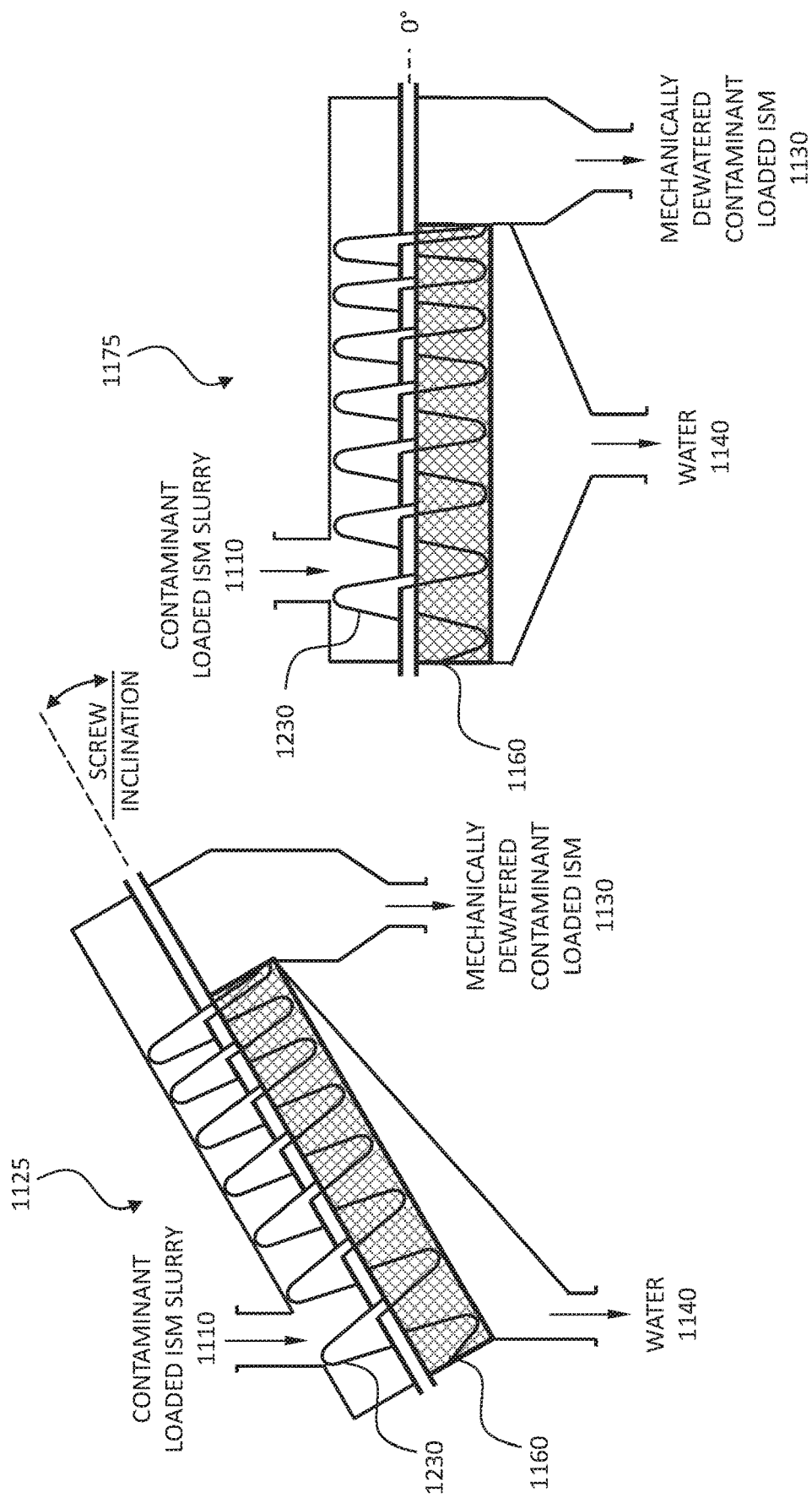
FIG. 6C depicts an inclined solid flight variable screw pitch mechanical dewatering region.
FIG. 6D depicts a horizontal solid flight variable screw pitch mechanical dewatering region.

A mechanical dewatering region may be appended to a HSIX unit 1000 after the binding region 470 to remove water from the contaminant loaded ISM slurry 1110 prior to drying and off-gassing, storage, and/or post processing. In FIGS. 6A and 6B the helical flights 1120 are solid and the shaft increases in diameter to produce a narrow annular ring through which the slurry passes at an increased pressure squeezing water from slurry 1110. In FIGS. 6C and 6D the helical flights 1230 are solid, the shaft stays a constant diameter, and the pitch of the flights increases along the shaft. The dewatering region housing may be equipped with filter screen panels 1160 sized according to the media dimension to allow water 1140 to be expelled from the slurry 1110. In some embodiments the water 1140 exiting the dewatering region 1125 may be sampled to determine if the water 1140 meets release standards. In some embodiments if the water 1140 still contains some level of contamination it may either be re-routed through back through the HSIX system 1000 or it may be reused or reprocessed. In some embodiments if the water 1140 meets release standards it may be released to the environment or reused. In some embodiments the mechanically dewatered contaminant loaded ISM 1130 exiting the mechanical dewatering region 1125 or 1175 from the second end proceeds into a drying and off-gassing regions such as those depicted in FIGS. 7A, 7B, 8A, and 8B.

Figures 7A, 7B:
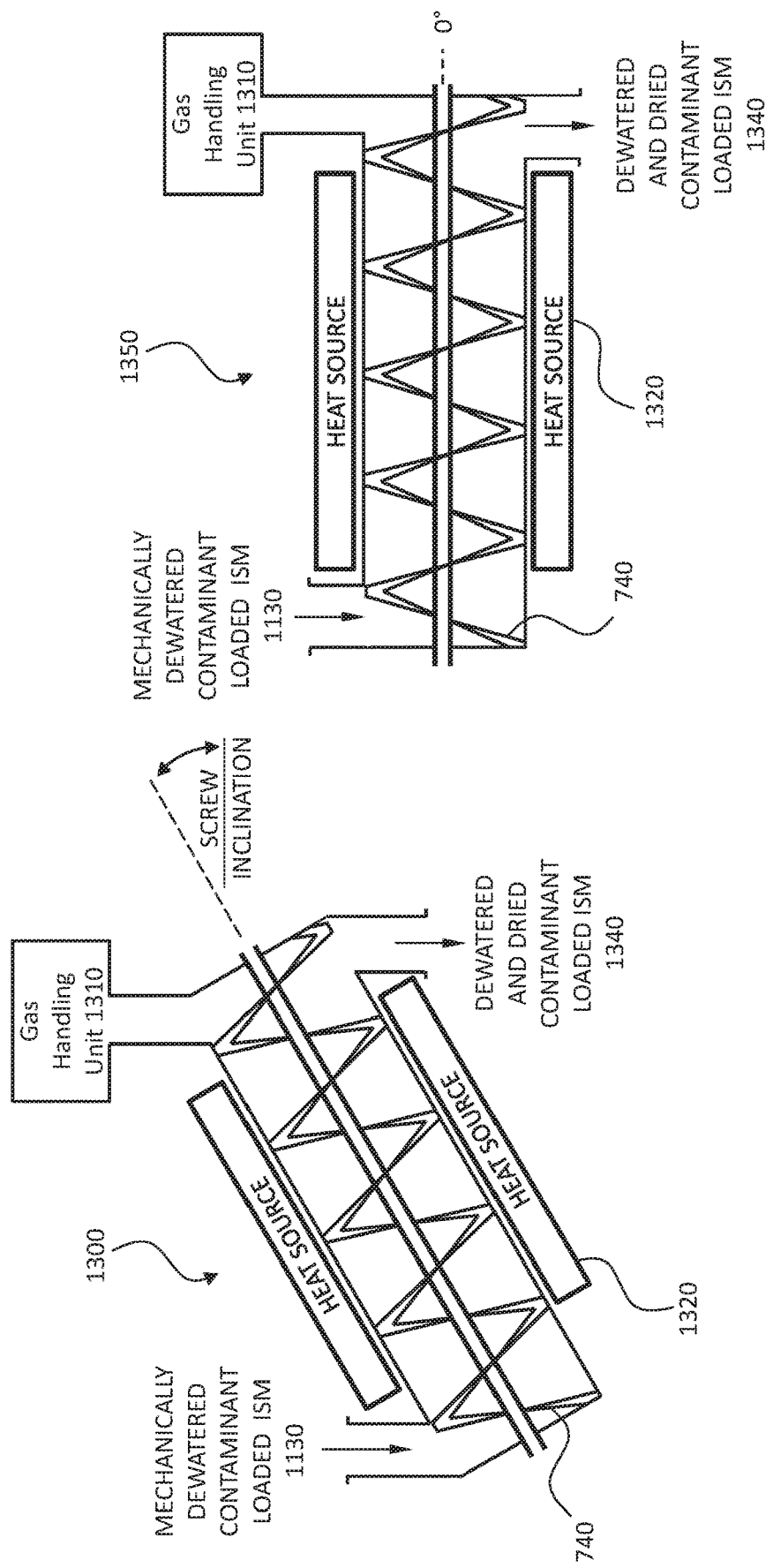
FIG. 7A depicts an inclined drying and off-gassing region with gas handling unit.
FIG. 7B depicts a horizontal drying and off-gassing region with gas handling unit.

FIG. 7A depicts an inclined drying and off-gassing region 1300. FIG. 7B depicts a horizontal drying and off-gassing region 1350. Optionally, the drying and off-gassing region may directly follow the binding region 470 (FIGS. 4 and 5*b*) and or a mechanical dewatering region. If the drying and off-gassing region follows both a binding region 470 and mechanical dewatering region, mechanically dewatered contaminant loaded ISM 1130 enters at the first end. The ribbon 740 dimension or pitch may be different from the mixing 460 or binding region 470 to account for the reduced slurry water content. Heat 1320 may be applied by induction, conduction, microwave, or any other means depending on local resources. Gases and vapors resulting from the heating of the contaminant loaded media may be piped to a gas handling unit 1310. The dewatered and dried contaminant loaded ISM 1340 may be sent to post processing and/or storage.

Figure 8A:
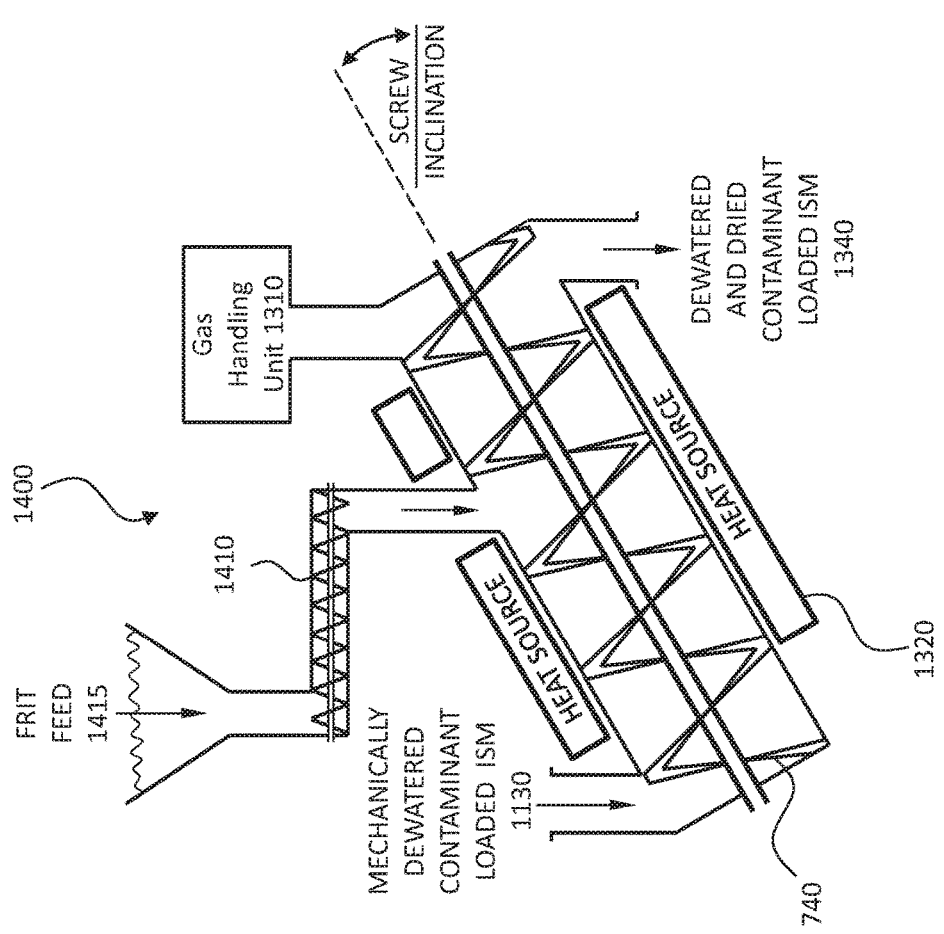
FIG. 8A depicts the drying and off-gassing region of FIG. 7A with the addition of a frit screw feed system.
Figure 8B:
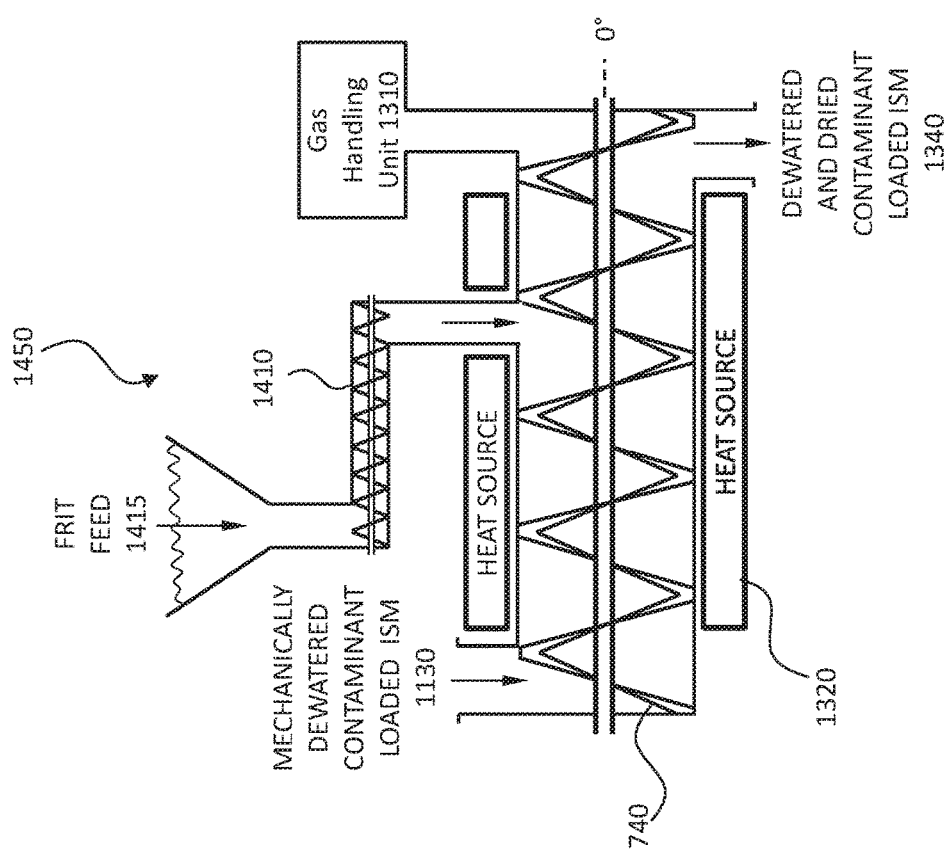
FIG. 8B depicts the drying and off-gassing region of FIG. 7B with the addition of a frit screw feed system.

In instances where mechanically dewatered contaminant loaded ISM 1130 is going to proceed to vitrification, an optional frit feed 1415 in FIG. 8A may be included at the initial end of the drying and off-gassing region. FIG. 8A depicts the drying and off-gassing region of FIG. 7A with the addition of the frit feed system 1415. FIG. 8B depicts the region of FIG. 8A in horizontal configuration. In some embodiments, wherein dewatered and dried contaminant loaded ISM 1340 is disposed of by vitrification, frit is fed through a speed controllable screw conveyor 1410, or other feed rate control mechanism, to the drying and off-gassing region of the extended inclined screw conveyor to provide a uniformly mixed, pre-heated feed to the vitrification system. In some embodiments the frit may be comprised of one or more of glass, glass formers, sand, and silica. Gasses that are released during processing may be passed through an off-gas handling unit 1310.

Figure 9A:
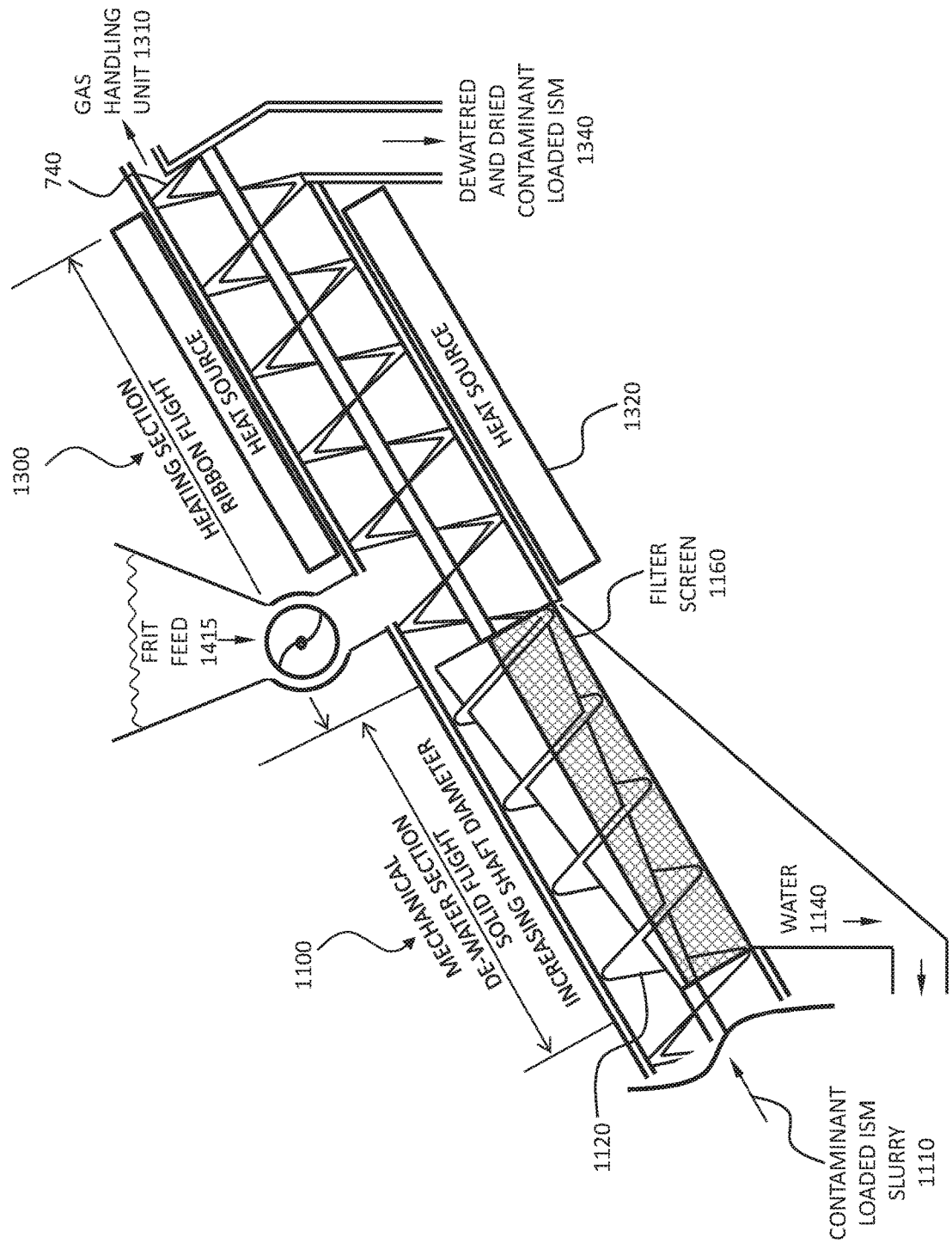
FIG. 9A depicts the inclined tapered shaft dewatering region of FIG. 6A followed by the inclined drying and off-gassing region of FIG. 8A.
Figure 9B:
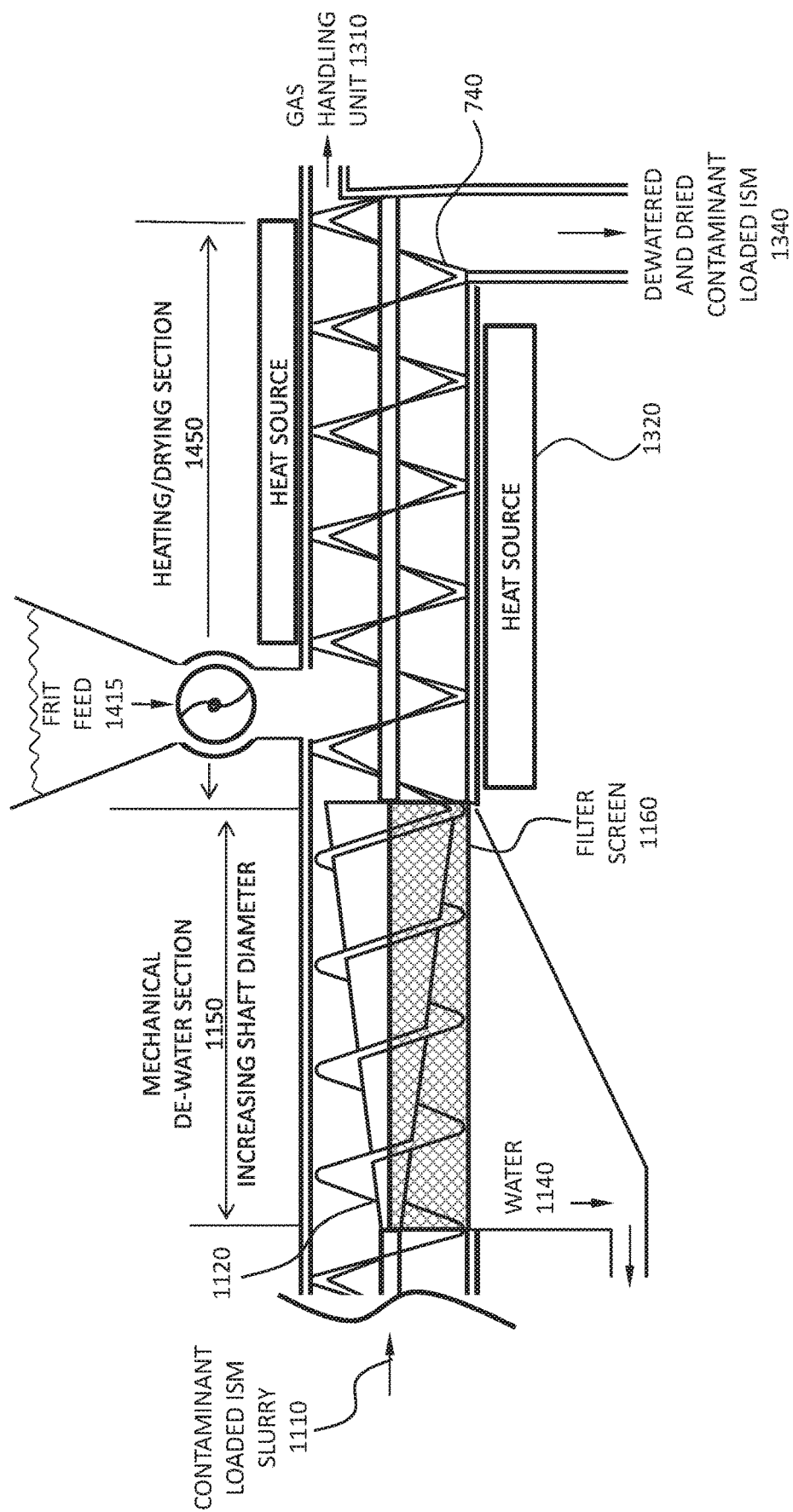
FIG. 9B depicts the horizontal tapered shaft dewatering region of FIG. 6B followed by the horizontal drying and off-gassing region of FIG. 8B.
Figure 9C:
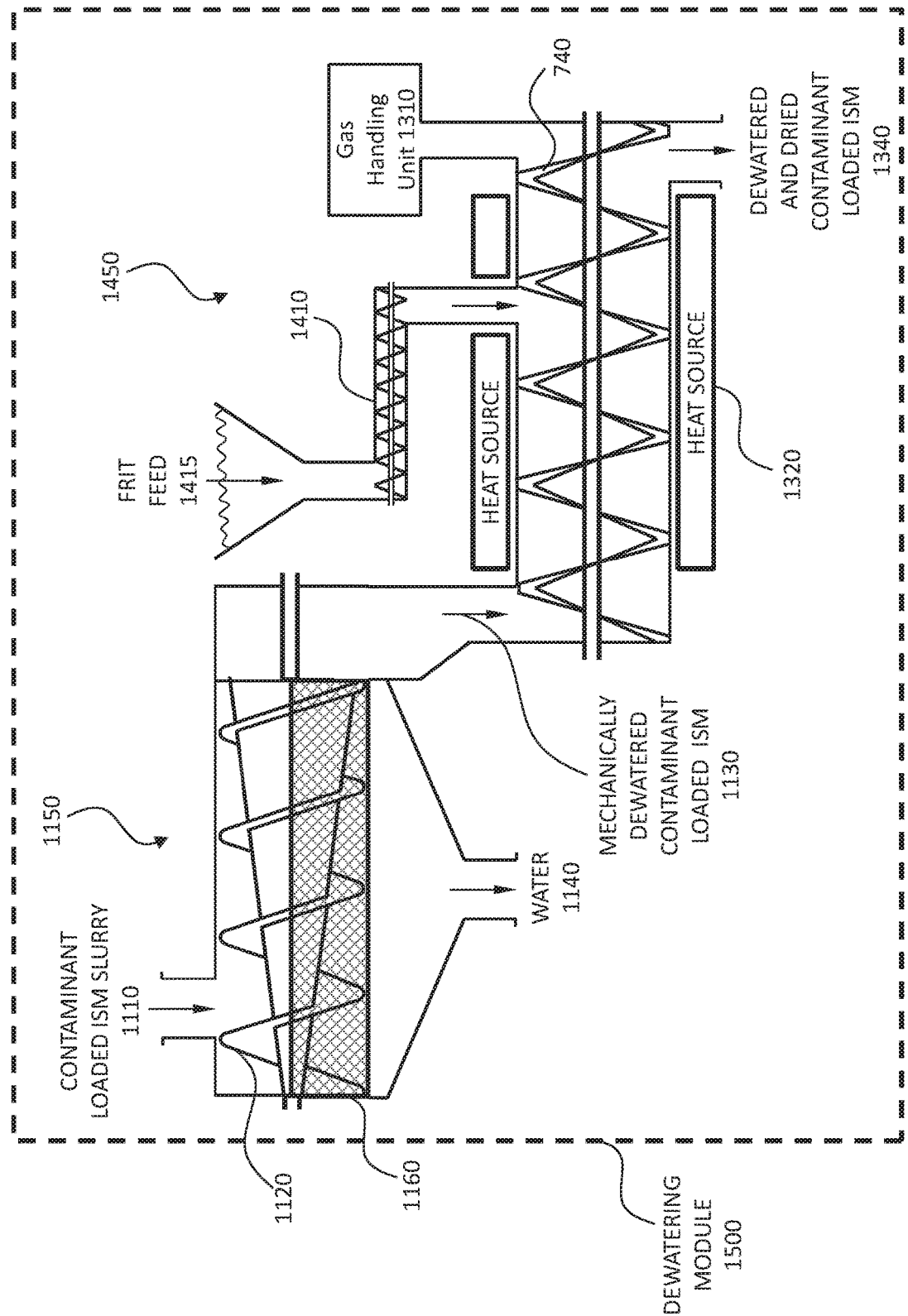
FIG. 9C depicts the horizontal tapered shaft dewatering region of FIG. 6B followed by an offset horizontal drying and off-gassing region of FIG. 8B.

FIG. 9A depicts the inclined tapered shaft dewatering region of FIG. 6A (1100) followed by the inclined drying and off-gassing region of FIG. 8A (1300). FIG. 9B depicts the horizontal tapered shaft dewatering region of FIG. 6B (1150) followed by the horizontal drying and off-gassing region of FIG. 8B (1450). FIG. 9C depicts the horizontal tapered shaft dewatering region of FIG. 6B (1150) followed by an offset horizontal drying and off-gassing region of FIG. 8B (1450).

Figure 9D:
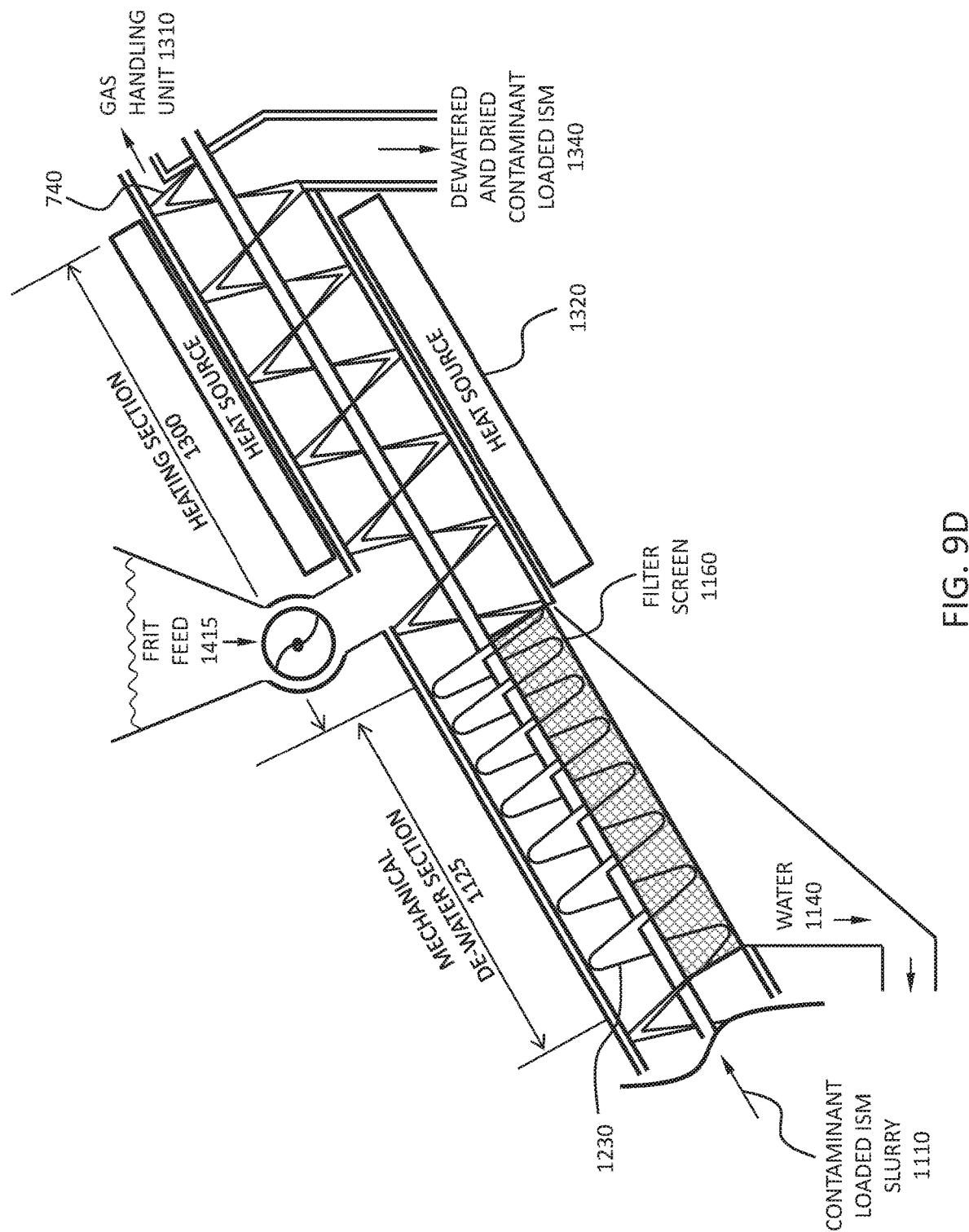
FIG. 9D depicts the inclined tapered shaft dewatering region of FIG. 6C followed by the inclined drying and off-gassing region of FIG. 8A.
Figure 9E:
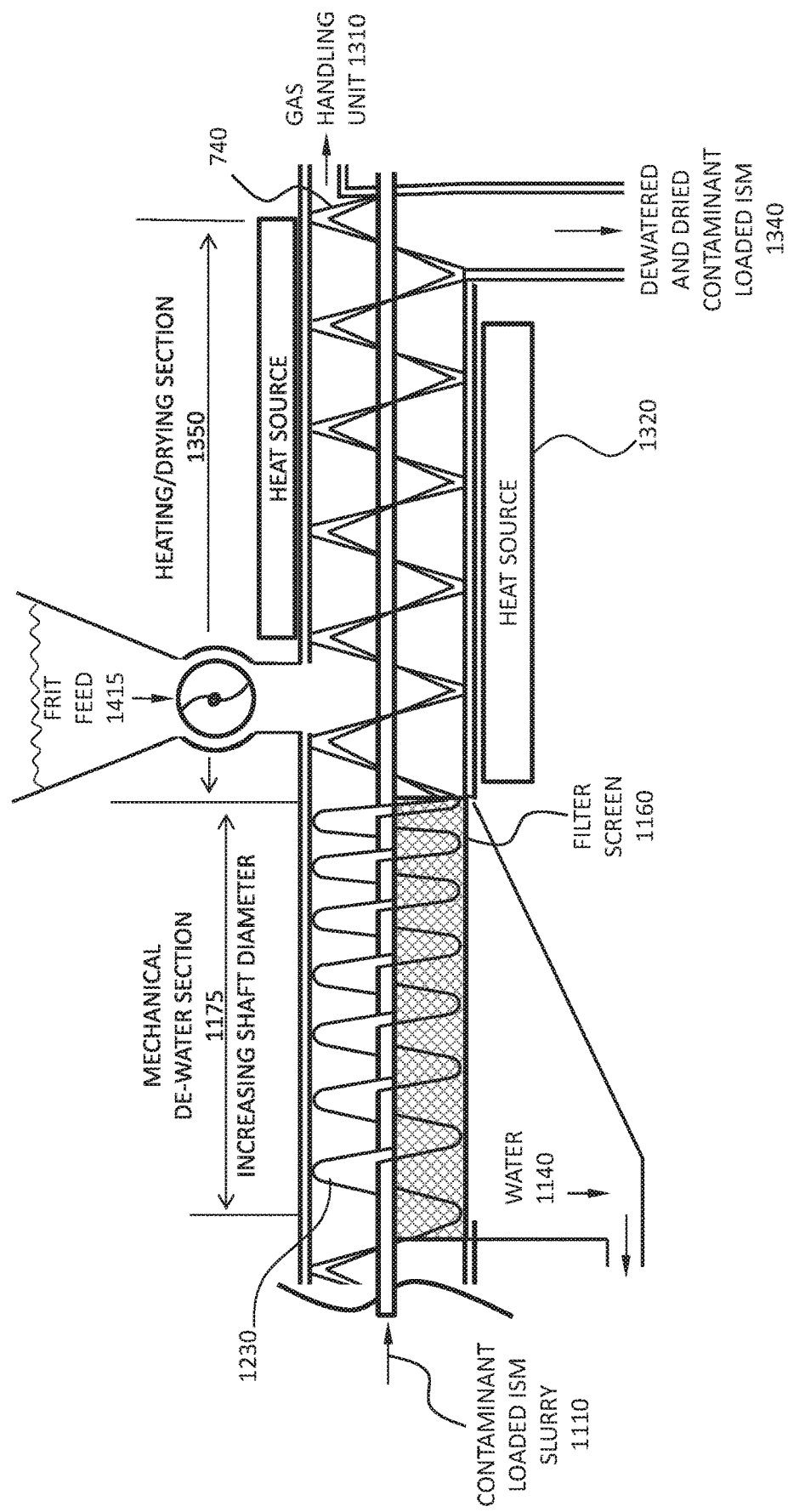
FIG. 9E depicts the horizontal tapered shaft dewatering region of FIG. 6D followed by the horizontal drying and off-gassing region of FIG. 8B.
Figure 9F:
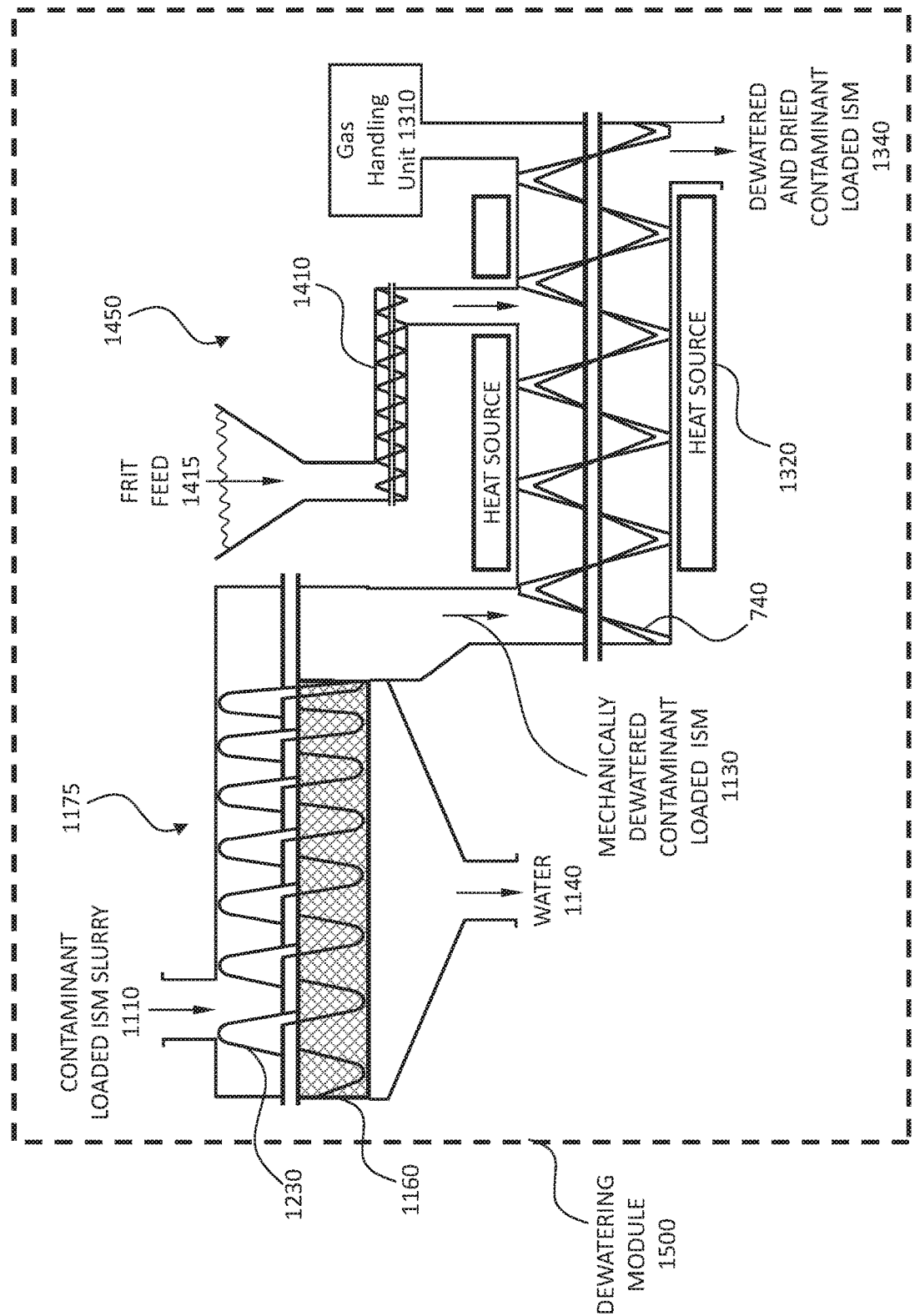
FIG. 9F depicts the horizontal tapered shaft dewatering region of FIG. 6D followed by an offset horizontal drying and off-gassing region of FIG. 8B.

FIG. 9D depicts the inclined increasing pitch dewatering region of FIG. 6C (1125) followed by the inclined drying and off-gassing region of FIG. 8A (1300). FIG. 9E depicts the horizontal increasing pitch dewatering region of FIG. 6D (1175) followed by the horizontal drying and off-gassing region of FIG. 8B (1450). FIG. 9F depicts the horizontal increasing pitch dewatering region of FIG. 6D (1175) followed by an offset horizontal drying and off-gassing region of FIG. 8B (1450).

Offsetting one or more processes in the system allows for clear separation between the processes such that the processes need not necessarily be run simultaneously. It also allows for simpler diversion of materials in the event of failure of any of the processes. In the event of failure of a specific process, the other processes preceding the failed process may continue to completion of a particular batch of material or continuously while the failed process is repaired or replaced. The diverted materials may be stored for later processing, proceed to another processing system, or be rerouted through a temporary or backup system for the failed process.

These combined regions may follow the mixing and binding regions of FIGS. 5A and 5B to prepare the contaminated product for final disposition. In some embodiments, the drying and off-gassing regions of FIGS. 7A and 7B may be used in place of the drying and off-gassing regions of FIGS. 8A and 8B. Frit 1415 is typically added when the contaminated product is going to proceed to vitrification. In these embodiments, the contaminated product is both mechanically and thermally dewatered. In some embodiments, the contaminated product is heated in preparation for post-processing such as vitrification.

Figure 10:
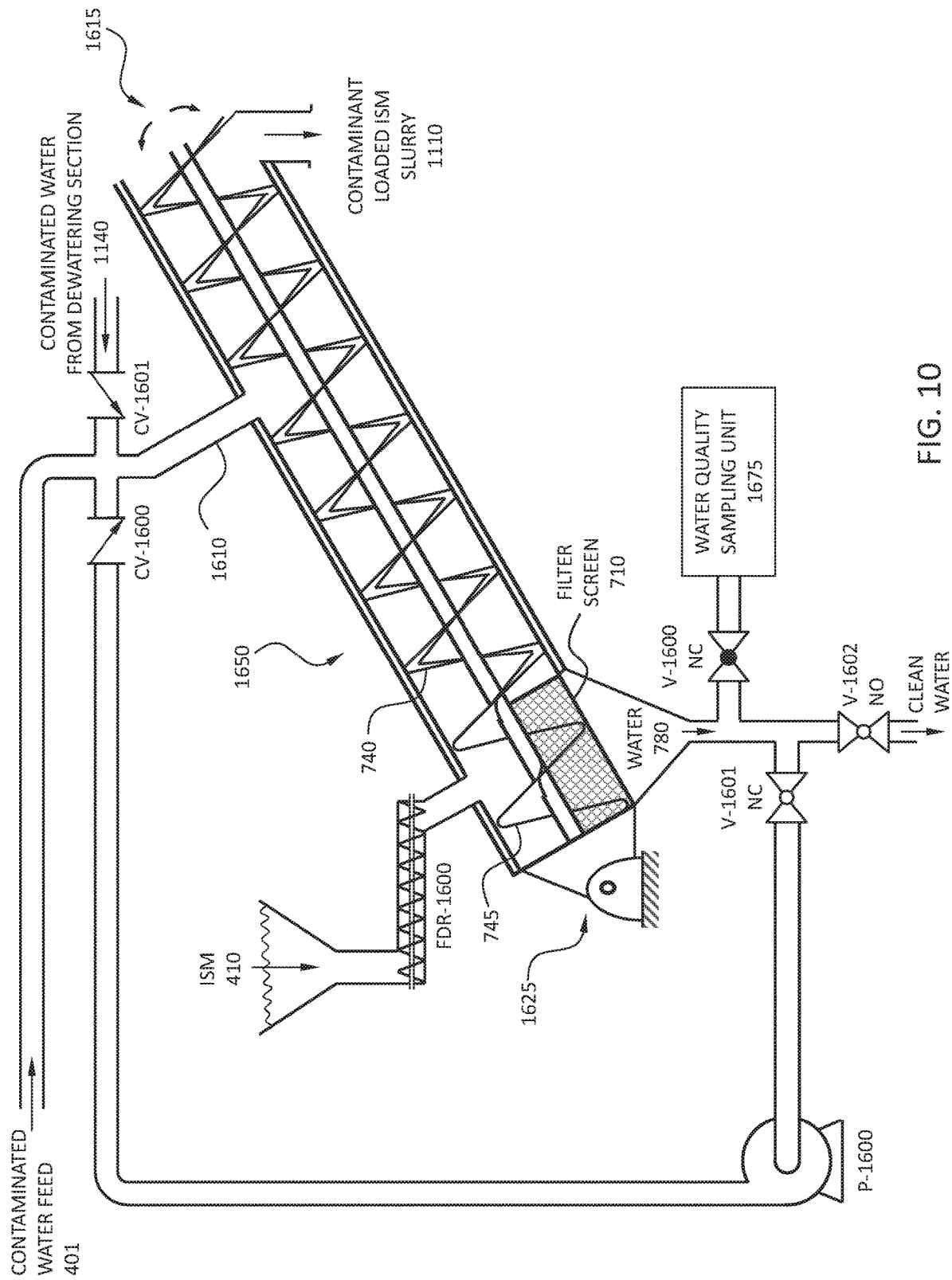
FIG. 10 shows an adjustable incline counter flow HSIX unit for use in combination with a dewatering region such as illustrated in FIGS. 6A through 6D.

FIG. 10 depicts an adjustable incline counter flow mixing region of an HSIX unit, referred to as an adjustable incline unit 1650, for possible use in combination with one or more of a dewatering region (FIGS. 6A, 6C) and a drying and off-gassing region (FIG. 7A). ISM 410 is fed into a solids feeder FDR-1600 or other feed rate control mechanism. The solids feeder FDR-1600 regulates the rate of flow of the ISM 410 into the first end 1625 of the adjustable incline unit 1650. The adjustable incline unit 1650 comprises a helical screw down the full length wherein the section of the helical screw at the first end is solid flight 745 and the rest of the helical screw is ribbon flight 740 as in FIG. 5A. ISM 410 is transported up the adjustable incline unit 1650 towards the second end 1615. Contaminated water 401 enters near the second end 1615 of the adjustable incline unit 1650 from at least one of two sources: 1) contaminated water refeed 1140 from one or more locations within the complete HSIX unit 1000 through check valve CV-1601 and 2) external contaminated water feed 401. The contaminated water travels from the inlet 1610 towards the first end 1625 of the adjustable incline unit 1650, opposite the ISM 410 flow. As the ISM 410 and the contaminated water flow in opposite directions through the adjustable incline unit 1650, radioactive ions from the contaminated water will be transferred to the ISM 410. As the ISM 410 progresses upwards towards the second end 1615 of the adjustable incline unit 1650 it will become more and more loaded with ions until it exits the adjustable incline unit 1650 at the second end 1615 as a contaminant loaded slurry 1110. From the second end 1615 of the adjustable incline unit 1650 the contaminant loaded slurry 1110 may be fed into other regions as previously described. When the water reaches the first end 1625 of the adjustable incline unit 1650 it is should be essentially clean. Clean water may exit the system through valve V-1602 (normally open).

The water exiting the first end 1625 of the adjustable incline unit 1650 may flow through valve V-1600 (normally closed) to be sampled by a water quality sampling unit 1675. If the water does not meet release standards, or the system in in startup/setup/balancing mode, the water may be recycled to the system. A re-circulation system is provided for system start-up/set-up/balancing. The system can be charged with an initial quantity of ISM 410, the adjustable incline unit 1650 inclination and speed can be set to take material to the second end 1615 of the adjustable incline unit 1650 and allow it to tumble back without discharge. Contaminated water can be introduced and recirculated resulting in a non-productive system in equilibrium which is the starting point for a controlled introduction of contaminated water, and ISM 410 feed rate and management of the adjustable incline unit 1650 inclination, all while monitoring the effluent water condition, thus bringing the system up to operating condition in a controlled manner. If the water is recycled into the system it will proceed through valve V-1601 (normally closed), pump P-1600, and check valve CV-1600 where it may be mixed with contaminated water from at least one of contaminated water feed 401 and contaminated water refeed 1140 at the inlet to the adjustable incline unit 1650.

Other Embodiments

In some embodiment, the disclosed system may be implemented with a Mobile Processing System (MPS, as in U.S. patent application Ser. No. 14/748,535 previously incorporated by reference herein) comprising of modular components and processing systems implemented on highly portable platforms, such as skids or shipping containers. These portable platforms can be moved around a site on trailers and can be operated while on these same trailers. The platforms can be arranged in any combination of operating modes that allow flexibility depending on operations required to process selected materials. Each platform comprises of an enclosed, modified ISO shipping container. In some embodiments one or more platforms further comprise a drip pan and leak detection. Process lines between platforms may comprise of hoses with double containment for the prevention of spills to the environment.

The HSIX unit may be implemented as an ion-specific media (ISM) module with an MPS, which includes processes and methods for the separation, isolation, or removal (collectively "separation") of specific radioactive ions from radioactive waste. In some embodiments of the MPS, the processes and methods further include a modular skid for the vitrification of the separated ions, generally with the ISM; this ion-specific vitrification (ISV) is often a step in a larger scheme of preparing the radioactive ions for long-term storage or other disposition. In many cases, a combined process that includes both ion separation using ISM and ion-specific vitrification—i.e., a combined ISM/ISV process) is part of an MPS for treating radioactive waste.

Some embodiments may comprise a control system for monitoring and controlling system operations in one or more of the regions. The control system may be at least one of remote and local to the system. Remote monitoring may be performed on any one or more of smartphones, laptops, tablets, and other remote devices. One or more sensors of similar or different types may be implemented for monitoring and control of operations. Sensors may comprise one or more of flow sensors, radiation sensors, temperature sensors, moisture sensors, pressure sensors, and speed sensors.

In some embodiments the system temperature may be controlled in one or more regions or at a system level. In some embodiments the HSIX unit housing may further comprise passages such that flow of exiting gases and vapors may be controlled and or used as an auxiliary heat source.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

Having described and illustrated the principles of the systems, methods, processes, and/or apparatuses disclosed herein in a preferred embodiment thereof, it should be apparent that the systems, methods, processes, and/or apparatuses may be modified in arrangement and detail without departing from such principles. Claim is made to all modifications and variation coming within the spirit and scope of the following claims.

The embodiments of the invention in which an exclusive property or privilege is claimed are defined as follows:

1. An ion exchange media conveyance system comprising:
   an inclined housing including:
   a first end;
   a second end elevated relative to the first end, wherein the inclined housing is adjustable to change how elevated the second end is relative to the first end;
   a central shaft extending from the first end to the second end;
   a helical screw disposed in the inclined housing and rotatable about the central shaft, at least a portion of the helical screw including a ribbon screw;
   an ion exchange media inlet passage disposed in the housing nearer the first end than the second end, the ion exchange media inlet configured to introduce ion exchange media into the inclined housing;
   a water inlet passage disposed in the housing nearer the second end than the first end, the water inlet passage configured to introduce water into the inclined housing to form a slurry with the ion exchange media;
   an ion exchange media outlet passage defined in the housing nearer the second end than the water inlet passage, the ion exchange media outlet passage configured to discharge the ion exchange media from the inclined housing;
   a water outlet passage defined in the housing nearer the first end than the second end, the water outlet passage configured to discharge the water from the inclined housing; and
   a water recirculation line fluidly coupled to the water inlet passage and the water outlet passage, the water passing through the water recirculation line in a non-productive balancing mode, the balancing mode including the inclined housing placed in a balancing mode inclination and the helical screw rotating about the central shaft at a balancing mode speed and wherein the balancing mode inclination and the balancing mode speed cause the ion exchange media to tumble toward the first end of the inclined housing such that no ion exchange media is discharged via the ion exchange media outlet passage.

2. The system of claim 1, wherein the helical screw is rotatable relative to the inclined housing.

3. The system of claim 1, wherein the inclined housing is rotatable with the helical screw about the central shaft.

4. The system of claim 1, wherein the water outlet passage includes a filter screen allowing the water to pass therethrough while preventing the ion exchange media from passing therethrough.

5. The system of claim 1, wherein the helical screw further includes at least one solid helical flight disposed adjacent the first end of the inclined housing.

6. The system of claim 1, wherein the ribbon screw allows at least some of the ion exchange media to tumble toward the first end of the inclined housing to agitate the slurry.

7. The system of claim 6, wherein the ribbon screw further includes:
a ribbon helically surrounding the central shaft; and
at least one support member connecting the ribbon to the central shaft, the at least one support member configured to further agitate the slurry.

8. The system of claim 1, further comprising a water quality sampling unit for monitoring water quality of water exiting the water outlet passage.

9. The system of claim 8, wherein monitored water exiting the water outlet passage may be recycled to the ion exchange media conveyance system.

10. An ion exchange media conveyance system comprising:
an inclined housing including:
a first end;
a second end elevated relative to the first end wherein the inclined housing is adjustable to change how elevated the second end is relative to the first end;
a central shaft extending from the first end to the second end;
a helical screw disposed in the inclined housing and rotatable about the central shaft, at least a portion of the helical screw including a ribbon screw;
an ion exchange media inlet passage disposed in the housing nearer the first end than the second end, the ion exchange media inlet configured to introduce ion exchange media into the inclined housing;
a water inlet passage disposed in the housing nearer the second end than the first end, the water inlet passage configured to introduce water into the inclined housing to form a slurry with the ion exchange media;
an ion exchange media outlet passage defined in the housing nearer the second end than the water inlet passage, the ion exchange media outlet passage configured to discharge the ion exchange media from the inclined housing;
a water outlet passage defined in the housing nearer the first end than the second end, the water outlet passage configured to discharge the water from the inclined housing;
a water recirculation line fluidly coupled to the water inlet passage and the water outlet passage, the water passing through the water recirculation line in a non-productive balancing mode, the balancing mode including the inclined housing placed in a balancing mode inclination and the helical screw rotating about the central shaft at a balancing mode speed and wherein the balancing mode inclination and the balancing mode speed cause the ion exchange media to tumble toward the first end of the inclined housing such that no ion exchange media is discharged via the ion exchange media outlet passage; and
a water quality sampling unit for monitoring water quality of water exiting the water outlet passage, wherein monitored water exiting the water outlet passage may be recycled to the ion exchange media conveyance system.

11. The system of claim 10, wherein the helical screw is rotatable relative to the inclined housing.

12. The system of claim 10, wherein the inclined housing is rotatable with the helical screw about the central shaft.

13. The system of claim 10, wherein the water outlet passage includes a filter screen allowing the water to pass therethrough while preventing the ion exchange media from passing therethrough.

14. The system of claim 10, wherein the helical screw further includes at least one solid helical flight disposed adjacent the first end of the inclined housing.

15. The system of claim 10, wherein the ribbon screw allows at least some of the ion exchange media to tumble toward the first end of the inclined housing to agitate the slurry.

16. The system of claim 15, wherein the ribbon screw further includes:
a ribbon helically surrounding the central shaft; and
at least one support member connecting the ribbon to the central shaft, the at least one support member configured to further agitate the slurry.

* * * * *